US012370769B2

(12) United States Patent
Dougherty, Jr. et al.

(10) Patent No.: US 12,370,769 B2
(45) **Date of Patent: *Jul. 29, 2025**

(54) ROTARY TABLET PRESS WITH TORQUE MOTOR DRIVE ASSEMBLY INCLUDING A RETRACTABLE DRIVE SHAFT

(71) Applicant: INDUSTRIAL PHARMACEUTICAL RESOURCES, INC., Bartlett, IL (US)

(72) Inventors: Joseph I. Dougherty, Jr., Glen Ellyn, IL (US); Yan Chen, Aurora, IL (US)

(73) Assignee: Industrial Pharmaceutical Resources, Inc., Bartlett, IL (US)

( * ) Notice: Subject to any disclaimer, the term of this patent is extended or adjusted under 35 U.S.C. 154(b) by 45 days.

This patent is subject to a terminal disclaimer.

(21) Appl. No.: 18/543,958

(22) Filed: Dec. 18, 2023

(65) Prior Publication Data

US 2024/0116259 A1 Apr. 11, 2024

Related U.S. Application Data

(63) Continuation-in-part of application No. 17/326,653, filed on May 21, 2021, now Pat. No. 11,850,817.

(60) Provisional application No. 63/029,124, filed on May 22, 2020.

(51) Int. Cl.

| | |
|---|---|
| ***B30B 15/14*** | (2006.01) |
| ***B30B 11/00*** | (2006.01) |
| ***B30B 11/08*** | (2006.01) |
| ***B30B 15/02*** | (2006.01) |

(52) U.S. Cl.

CPC ............ *B30B 11/005* (2013.01); *B30B 11/08* (2013.01); *B30B 15/026* (2013.01)

(58) Field of Classification Search

CPC ......... B30B 9/30; B30B 9/301; B30B 9/3032; B30B 15/0023; B30B 15/08; B30B 15/32

See application file for complete search history.

(56) References Cited

U.S. PATENT DOCUMENTS

| | | | |
|---|---|---|---|
| 4,601,866 | A | 7/1986 | David |
| 5,253,572 | A | 10/1993 | Uehara |
| 6,361,302 | B1 | 3/2002 | Hinzpeter et al. |

(Continued)

FOREIGN PATENT DOCUMENTS

| | | | |
|---|---|---|---|
| WO | 2011061564 | A1 | 5/2011 |

OTHER PUBLICATIONS

"ECM-Based Rotary Tablet Presses", GEA Pharma Systems—Courtoy Technologies.

*Primary Examiner* — Thu Khanh T. Nguyen

(74) *Attorney, Agent, or Firm* — Wood, Phillips, Katz, Clark & Mortimer

(57) ABSTRACT

A rotary tablet press comprises a press housing having bottom and top ends. A compression assembly in the press housing includes pressure roll assemblies. A drive housing extends outwardly from the top end of the press housing. A motor drive assembly is in the drive housing and comprises a turret motor rotationally driving a drive shaft extending downward from the turret motor, the drive shaft being mounted for axial movement along a vertical axis in the turret motor. A drive shaft control is operable to controllably raise and lower the drive shaft. A turret assembly is mounted to the press housing below the drive housing and about the vertical axis so that the pressure roll assemblies engage the turret assembly, the drive shaft engaging the turret assembly to rotate the turret assembly responsive to the drive shaft control lowering the drive shaft.

14 Claims, 22 Drawing Sheets

(56) References Cited

U.S. PATENT DOCUMENTS

| | | | |
|---|---|---|---|
| 6,676,863 | B2 | 1/2004 | Christiaens et al. |
| 6,830,442 | B2 | 12/2004 | Cecil |
| 8,025,498 | B2 | 9/2011 | Haase et al. |
| 8,277,707 | B2 | 10/2012 | Waldron |
| 9,314,946 | B2 | 4/2016 | Pannewitz |
| 9,840,055 | B2 | 12/2017 | Janke et al. |
| 10,052,836 | B2 | 8/2018 | Vogeleer et al. |
| 10,449,119 | B2 | 10/2019 | Scheffler et al. |
| 2010/0221374 | A1 | 9/2010 | Le Floc'h |
| 2011/0012283 | A1 | 1/2011 | Waldron |
| 2016/0361885 | A1 | 12/2016 | Oyama et al. |
| 2018/0178474 | A1 | 6/2018 | Vogeleer et al. |

ROTARY TABLET PRESS WITH TORQUE MOTOR DRIVE ASSEMBLY INCLUDING A RETRACTABLE DRIVE SHAFT

CROSS-REFERENCE TO RELATED APPLICATIONS

This application is a continuation-in-part of Ser. No. 17/326,653, filed May 21, 2021, which claims priority of Provisional Ser. No. 63/029,124 filed May 22, 2020, the disclosures of which are hereby incorporated by reference in their entireties.

FIELD OF THE INVENTION

This invention relates to rotary tablet presses and, more particularly to a retractable drive shaft.

BACKGROUND OF THE INVENTION

Oral dosage medication is typically manufactured by directly compressing granulation on a rotary tablet press. Tooling is used on the tablet press to identify and produce specific products. The tooling consists of an upper punch, lower punch, and a die. To form a tablet, granulated powder material must be fed into a cavity formed by two punches and a die. The punches are pressed together with sufficient force to fuse the powder into a tablet.

All granulations are abrasive and due to the force at compaction, tools wear out and must be replaced. Maintaining quality tooling is essential to product consistency. Cleaning is also frequently required.

In a rotary tablet press, a turret is rotatable about a vertical axis and carries a plurality of dies. Each die has associated top and bottom punches driven by top and bottom cams to compress the granulation into a tablet. For cleaning between batches or changeover for a different tablet, the turret with punches and cams is removable as a unit from the tablet press.

Such rotary tablet presses are provided by various manufacturers and described, for example, in U.S. Pat. Nos. 4,988,275 and 6,676,863 and EP1050399.

Prior art removable turret press designs incorporate a single press frame for structural support of the turret and pressure roll assemblies. These designs prevent the removal of the turret along with the machine base on which it is supported. These designs generally require an operator to disconnect, move and/or remove several components including removing a heavy turret and loading it onto an ancillary cart in order to change the press to a different tooling size or configuration such as bi-layer or tri-layer. These designs also constrain the tablet press to only utilize turrets having the same diameter and height dimensions. Prior art designs require cleaning and great care in transferring the equipment to a cleaning room without risk of cross contamination. Prior art presses with removable or detachable turrets incorporate mechanisms that attach to and drive the turret from beneath. This not only requires an ancillary cart but also the requirement to disconnect, move and/or remove press components and lift and load the turret.

Pending application Ser. No. 17/326,653, filed May 21, 2021, owned by Applicant herein, discloses a rotary tablet press comprising a base assembly including a press housing and a compression assembly in the press housing including pressure roll assemblies. A detachable module is removably mountable to the base assembly comprising a module base supporting a turret housing. A turret assembly is rotatably mounted in the turret housing about a vertical axis. The turret assembly comprises a plurality of die stations. The detachable module is selectively positioned at the base assembly so that the pressure roll assemblies engage the turret assembly to compress a granulation into a tablet at the die stations. A turret drive assembly comprises a turret motor and drive shaft. The drive shaft is aligned with the vertical axis and engaging the turret assembly to rotate the turret assembly.

The present invention is directed to improvements in design of a removable turret.

SUMMARY OF THE INVENTION

An object of the present invention is to provide a tablet press having a motor drive assembly with a retractable drive shaft for selectively engaging the turret assembly.

The motor drive assembly may be mounted above the turret assembly to facilitate removal of the turret assembly without removal of the motor drive assembly.

In accordance with the invention, a rotary tablet press comprises a press housing having bottom and top ends, the bottom for resting on a support surface. A compression assembly in the press housing includes pressure roll assemblies. A drive housing extends outwardly from the top end of the press housing. A motor drive assembly is in the drive housing and comprises a turret motor rotationally driving a drive shaft extending downward from the turret motor, the drive shaft being mounted for axial movement along a vertical axis in the turret motor. A drive shaft control is operable to controllably raise and lower the drive shaft. A turret assembly comprises a plurality of die stations, the turret assembly being mounted to the press housing below the drive housing and about the vertical axis so that the pressure roll assemblies engage the turret assembly to compress a granulation into a tablet at the die stations, the drive shaft engaging the turret assembly to rotate the turret assembly responsive to the drive shaft control lowering the drive shaft.

Further features will be readily apparent from the specification and from the drawings.

DETAILED DESCRIPTION OF THE INVENTION

Figure 1:
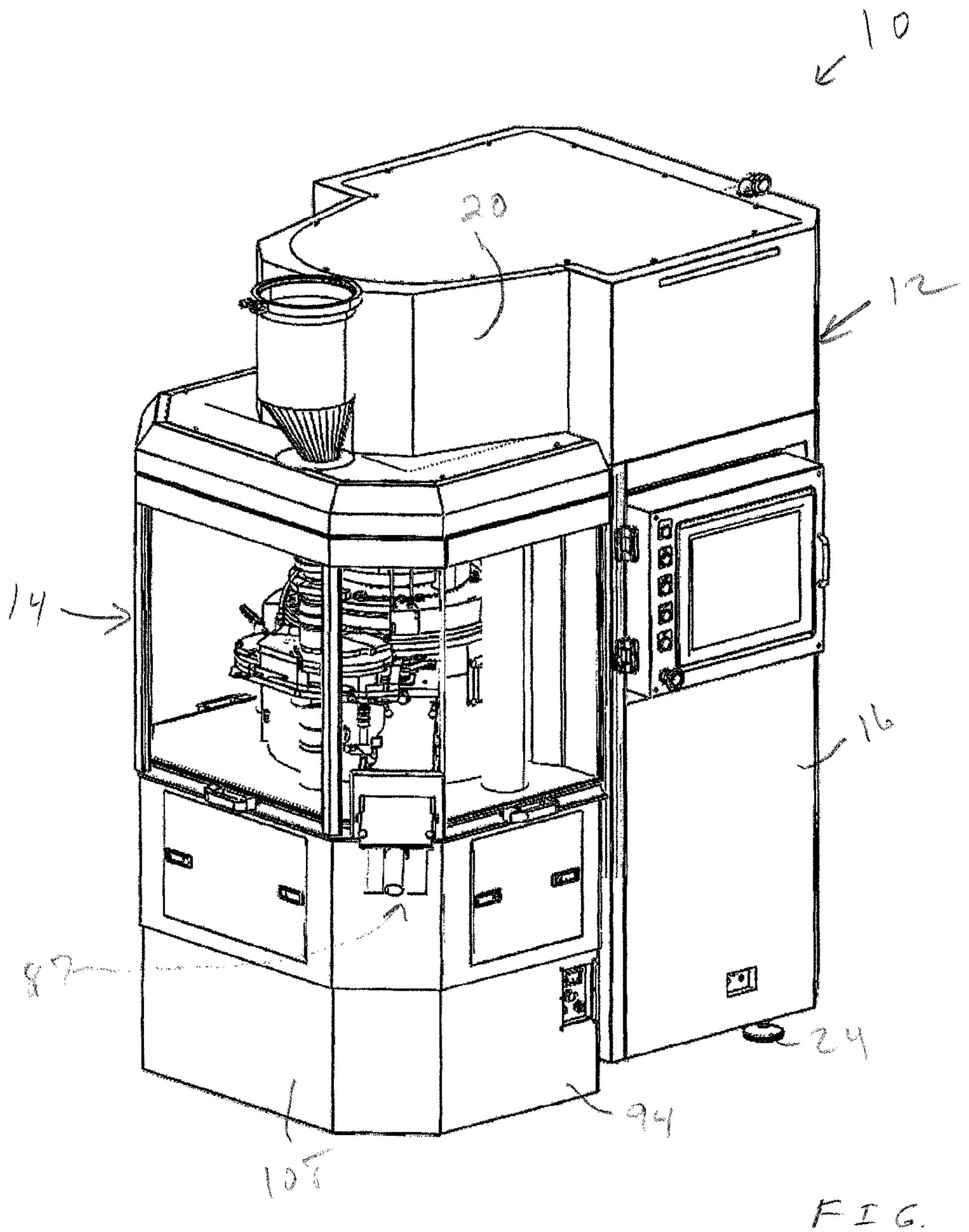
FIG. 1 is a perspective view of a rotary tablet press machine in accordance with the invention comprising a machine frame and a detachable turret module.

The present invention relates to a rotary tablet press comprising a base assembly or machine frame and detachable module. The machine frame incorporates motorized pressure roll assemblies and optionally a turret drive assembly. The detachable module comprises a module base, turret base, turret, cam body, cams, feeder, tablet discharge chute, hopper, upper enclosure, and guard doors. The detachable module could also incorporate pressure roll assemblies for bilayer or trilayer applications. The turret comprises chambers arranged circumferentially to hold upper punches, lower punches, and dies. As the turret rotates, punches follow a cam track and reciprocate into and out of dies that receive granulation as they are rotated under the feeder. A tablet is formed when the punches contact the pressure rolls causing compaction of the granulation in the die.

The disclosed tablet press is more configurable and flexible for tablet manufacturers, requires less time for changeover between batches, and contains dust generated during the tableting operation to minimize exposure to the operator. This is accomplished by housing the compression roll assemblies and turret assembly in two separate and distinct support structures that can be connected to one another and operate in unison as a tablet press.

The press is divided into two primary assemblies herein referred to as the machine frame and the detachable turret module. The machine frame incorporates motorized pressure roll assemblies that may move both linearly and axially. Having linear movement, the pressure rolls are automatically towards or away from one another moved into a position, if necessary, to allow the turret module to be detached and removed from the press frame without interference. The axial movement allows the compression assemblies housed in the machine frame to adjust tablet thickness during operation and to be configured for various turret modules containing turrets with different physical dimensions.

The press frame may incorporate the turret drive mechanisms that enable the drive shaft to be mounted above the turret. This frees up space in the module below the turret for incorporating vacuum, cleaning features, or used for other requirements. Additionally, the module cost and weight are reduced by not having to incorporate the drive motor and assembly in the module.

Isolating and housing the control components in the frame avoids the requirement for calibration of pressure roll positions, load cells or strain gages, and turret speed when a module is detached or attached.

A precision pneumatic, hydraulic, magnetic, physical connection, or other method is incorporated to secure the turret module to the machine frame. Alignment and mounting are designed to ensure the module can be precisely detached and attached to the frame without impacting the machine performance.

The detachable module comprising a module base, turret base, turret, cam body, cams, feeder, tablet discharge chute, hopper, upper enclosure, and guard doors eliminates the requirement for an external cart and significantly reduces the changeover time. An operator simply disconnects the powder inlet connection, presses a detach module button in the tablet press HMI software, disconnects cable connector(s), if required, and uses an automated guided vehicle (AGV), or other appropriate material handling mechanism, to remove the module in a matter of minutes. The AGV may be integrated into the detachable module or may be removable. In accordance with the invention the AGV comprises a controllable lifting mechanism for raising and lowering the detachable module to selectively attach the detachable module to the machine frame.

The illustrated and described rotary press machine improves upon the prior art tablet presses by isolating the pressure roll assemblies in a separate and distinct machine frame from a detachable turret module comprising of a turret and the base on which it is supported to provide a faster, more configurable, and safer solution for the customer and eliminating the need to lift and remove a heavy turret unit and load it onto an ancillary cart. Sealing the module minimizes the operator's exposure to granulation dust particles and enables the module to be transferred to a cleaning room with less risk of cross contamination. Prior art presses incorporate mechanisms that attach to and drive the turret from beneath. Having a detachable module that incorporates the turret supporting base eliminates the requirement for an ancillary cart as well as the requirement to disconnect, move and/or remove press components and lift and load the compression unit and/or turret.

Figure 2:
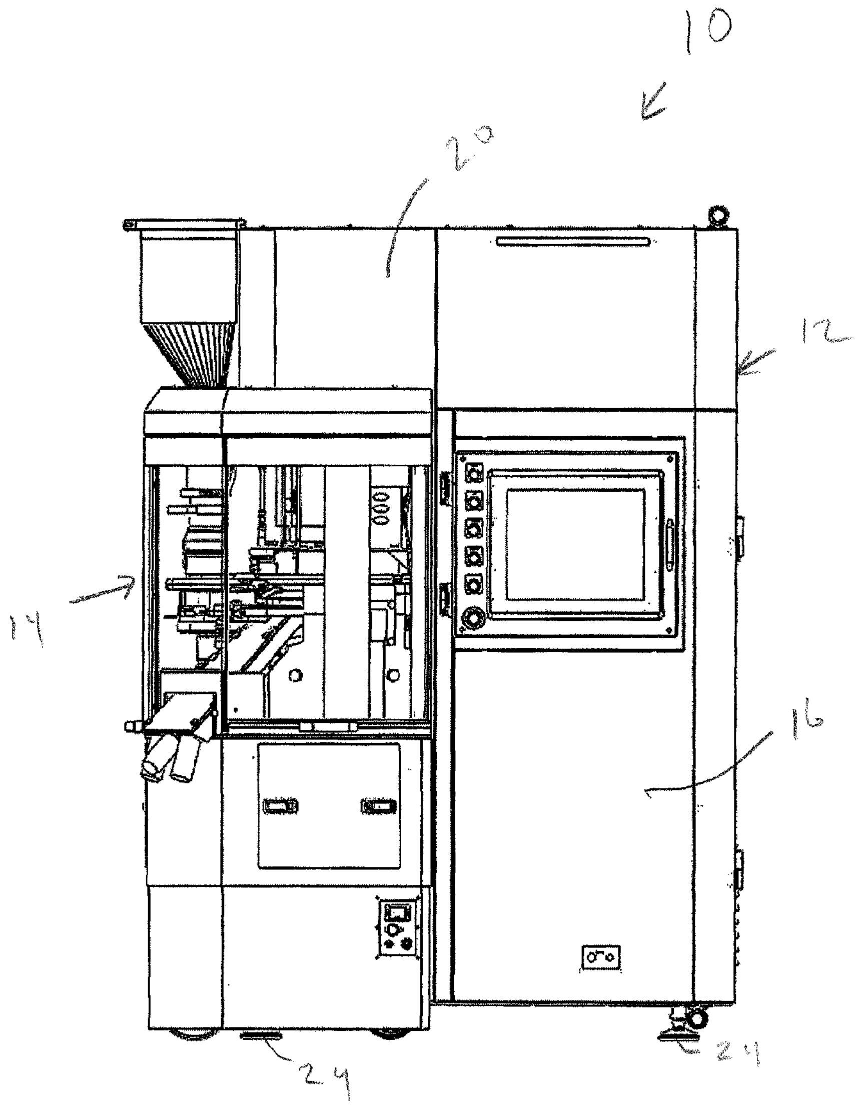
FIG. 2 is a right side view of the press machine of FIG. 1.

Referring initially to FIGS. 1 and 2, a rotary tablet press machine 10 in accordance with the invention is illustrated. The rotary tablet press machine 10 comprises a machine frame 12 and a removeable/detachable module 14, see also FIGS. 3-5.

In accordance with the invention, the machine frame 12 is designed to isolate the turret drive assembly and pressure roll assemblies, described below, in the machine frame 12 from the detachable module 14 to provide a faster, more configurable, and safer solution for the customer. Having a detachable module 14 that incorporates the turret supporting base, described below, eliminates the requirement for an ancillary cart as well as the requirement to disconnect, move and/or remove press components and to lift and load the compression unit and/or turret.

The machine frame 12 comprises a press housing 16. The press housing 16 is generally parallelepiped in shape with a front inset portion 18 for receiving the detachable module 14. An upper end of the press housing 16 extends forwardly above the inset portion 18 and defines a drive housing 20 at the top of the press housing 16. A connection base 22 extends forwardly of the bottom of the press housing 16 and is aligned with the drive housing 20. A plurality of adjustable pads 24 are provided on an underside of the press housing 16 and connection base 22 for supporting and leveling the machine frame 12 on a ground surface.

Figure 6:
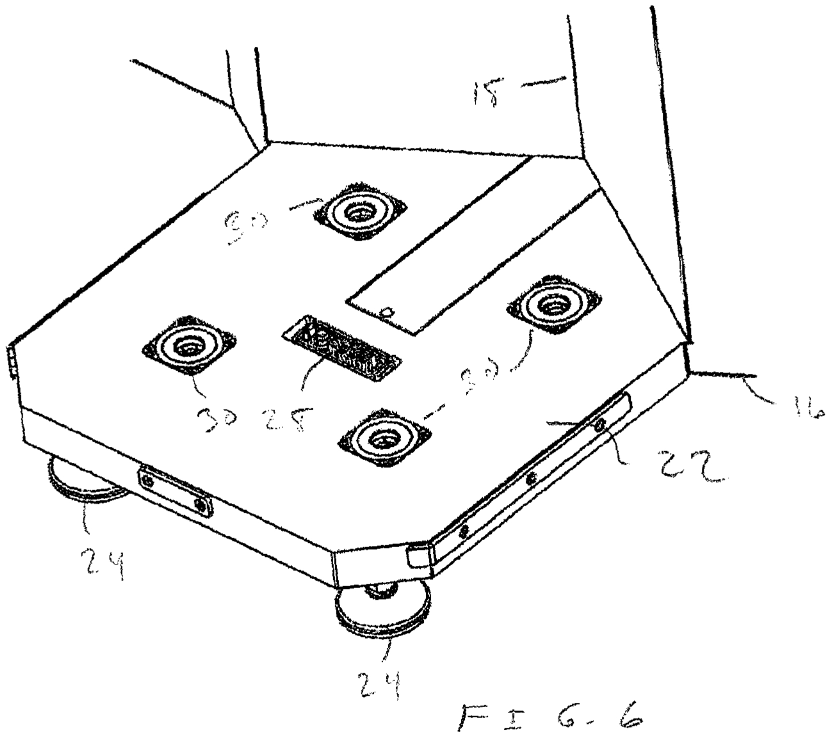
FIG. 6 is a cutaway perspective view of the machine frame illustrating connection components for mounting the turret module to the machine frame.

The press housing 16 includes interior space for control components (not shown) and includes an operator control panel 26. Provision is also made for providing necessary electrical connections between control devices in the press housing 16. Referring also to FIG. 6, the connection base 22 includes a female electrical quick connector 28 for providing electrical and pneumatic connections between the machine frame 12 and the detachable module 14, as described in greater detail below. The connection base 22 also includes four zero point clamp receivers 30 for mechanically securing the detachable module 14 to the machine frame 12.

The press housing 16 houses two motorized pressure roll assemblies 36 and 38. Some designs may use a single pressure roll assembly. The first roller assembly 36 has an upper roller 40 and a lower roller 42. The second roller assembly 38 has an upper roller 44 and a lower roller 46. The rollers 40 and 42 are in a plane about 120° to that of the rollers 44 and 46. The roller assemblies 36 and 38 are driven by linear drives, one of which is shown at 56 in FIG. 17. Particularly, the linear drive 56 operates to move the rollers 44 and 46 towards or away from one another to engage or disengage a turret during operation. Similarly, another linear drive (not shown) operates to move the rollers 40 and 42 towards or away from one another.

Figure 17:
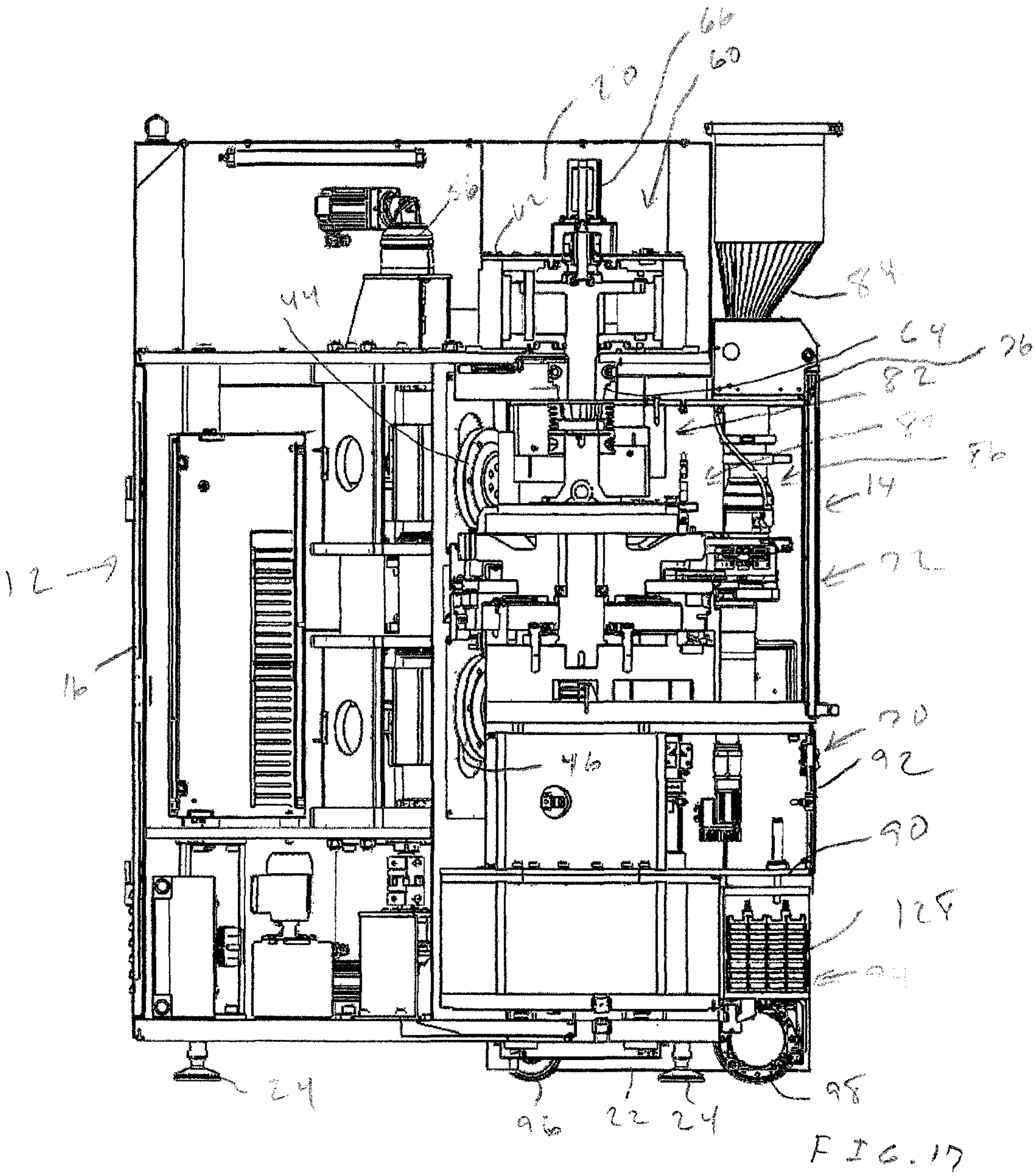
FIG. 17 is a sectional view taken along the line 17-17 of FIG. 11 with the turret module in the raised position.

The drive housing 20 houses a motor drive assembly 60, see FIG. 17, including a turret drive torque motor 62 which drives a downwardly depending drive shaft 64. The motor drive assembly 60 is configured to raise and lower the drive shaft 64 using a drive shaft control 66 to engage a turret for rotation therewith, as described in greater detail below.

Figure 7:
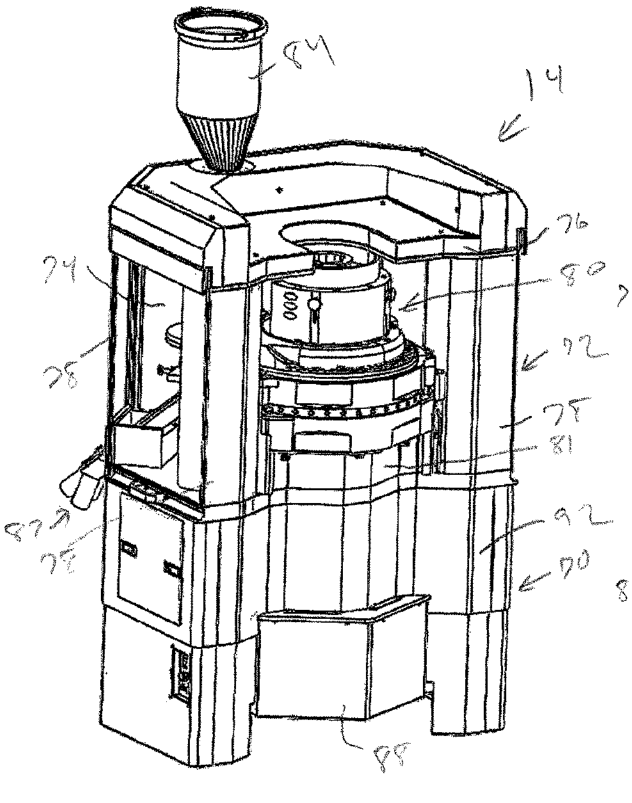
FIG. 7 is a right rear perspective view of the turret module of FIG. 2.
Figure 8:
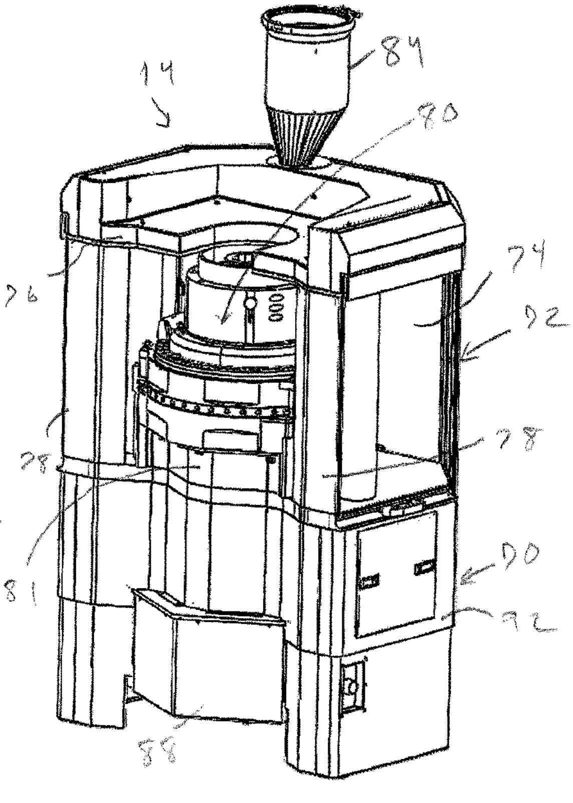
FIG. 8 is a left rear perspective view of the turret module of FIG. 2.

Referring to FIGS. 7 and 8, the detachable module 14 is of a shape adapted to be received on the machine frame 12. The specific details of the size and shape do not form part of the invention and may be specific to the overall design characteristics of the particular tablet press.

The detachable module 14 comprises a module base 70 supporting a turret housing 72. The turret housing 72 has a top wall 76 supported on pillars 78 which are in turn supported on the module base 70. A transparent outer wall 74 surrounds the front of the turret housing 72 to isolate the internal assemblies. The outer wall 74 may be of a clear polycarbonate material. When the detachable module 14 is secured to the machine frame 12, the detachable module 14 is sealed by incorporating an upper enclosure via the outer wall 74. The back of the turret housing 72 is open to allow the pressure roll assemblies 36 and 38 to engage the upper and lower punches, as described below.

In a rotary tablet press, a turret is rotatable about a vertical axis and carries a plurality of dies. Each die has associated top and bottom punches driven by top and bottom cams to compress the granulation into a tablet. An upper punch, a lower punch and a die are together referred to as a station. This is discussed below.

The turret housing 72 encloses a turret assembly 80. The turret assembly 80 is mounted to a support 81 which is in turn supported on the module base 70. The turret assembly 80 is rotatable relative to the support 81. The turret assembly 80 typically includes a die table and upper punch guide and lower punch guide assemblies. The turret module 14 houses the turret assembly 80 along with a cam body, cams, feeder, tablet discharge chute, and a hopper. Although not shown in detail, the turret assembly 80 comprises chambers arranged circumferentially to hold upper punches, lower punches, and dies. As the turret assembly 80 rotates, punches follow a cam track and reciprocate into and out of dies that receive granulation as they are rotated under the feeder, as is conventional. A tablet is formed when the punches contact the pressure rolls 40, 42, 44 and 46 in FIG. 3, discussed above, causing compaction of the granulation in the die. This general operation is conventional, and the exact configuration will depend, in part, on the tablet being manufactured. The invention herein is particularly directed to the use of the detachable and removable module 14. This isolates the turret drive, compression assembly, and controls from the turret, feeder, hopper, chute, cams, and module base. Current presses have removable components (i.e. turret, columns). The removable module feature is unique by creating a quick disconnect for faster changeover providing increased flexibility and versatility for changeover to different tooling sizes and/or turret sizes and configuration for bilayer and trilayer tableting, improved ease of cleaning and containment, and it eliminates impact of calibration when moving the press. Also, the turret top drive 62 in FIG. 17 moves the drive system for the turret to the top of the press.

In accordance with the invention, the turret assembly 80 is driven by an inlet coupling 82 on the top wall 76 engageable by the drive shaft 64, see FIG. 17, for driving the turret assembly 80 from above. A powder inlet 84 is provided in the top wall 76 for providing granulated powder to a feeder assembly 86. The feeder assembly 86 is driven by a feeder motor, not shown, to feed powder to the dies. A tablet take-off (not shown) guides the tablet as it is ejected from the die into a discharge chute 87, see FIG. 1.

Figure 9:
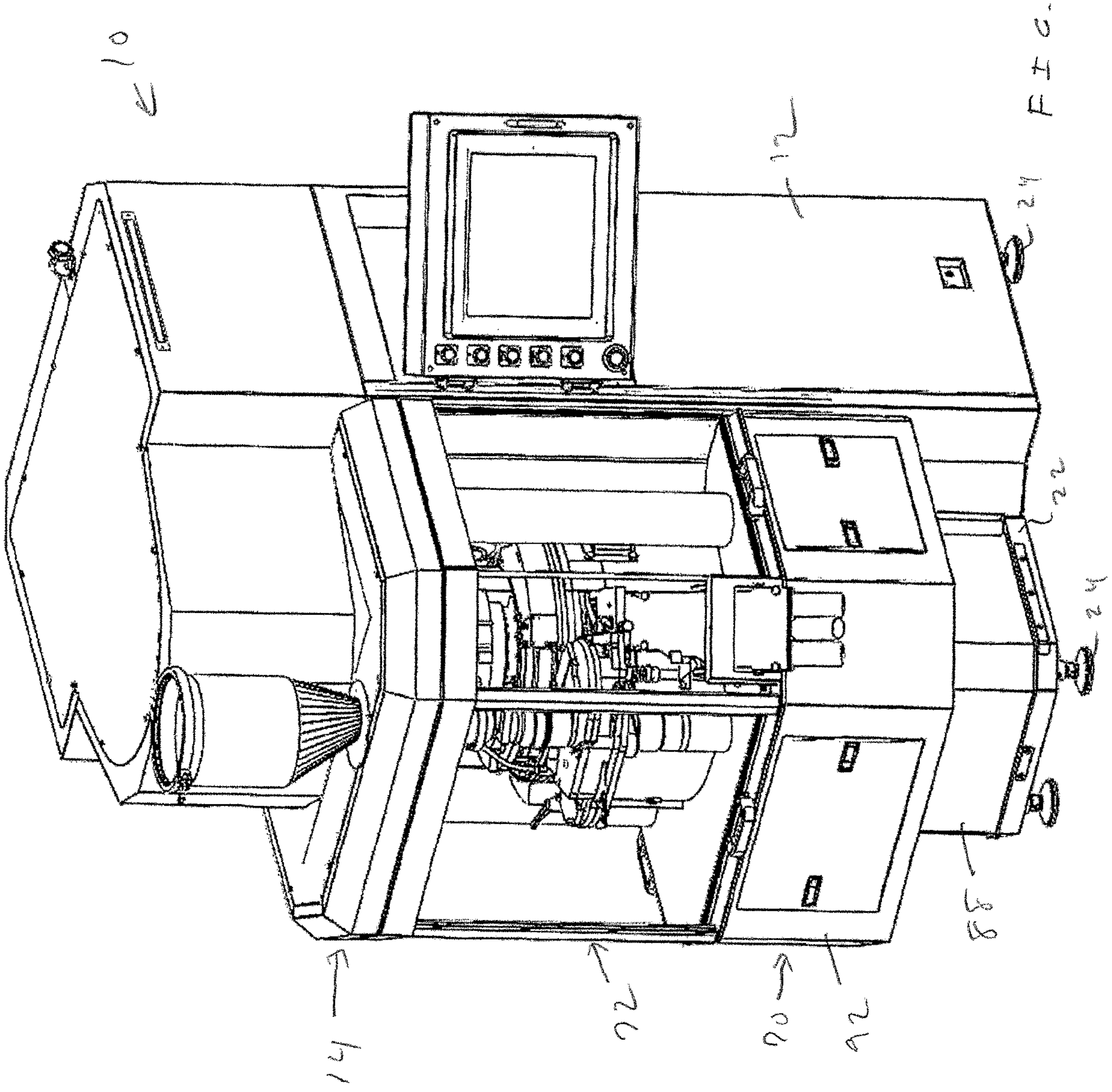
FIG. 9 is a perspective view of the rotary tablet press machine of FIG. 1, with an AGV cart removed from the turret module.

Referring to FIGS. 7 and 8, the module base 70 has a bottom support housing 88 for seating on the machine frame connection base 22, see FIG. 9. A weldment plate 90 is atop the support housing 88, see FIG. 15, and defines a bottom wall for a control housing 92. The control housing 92 cantilevers from the support housing 88 at the sides and front, see FIG. 9. An automated guided vehicle (AGV) cart 94 is of a generally U-shaped configuration, see also FIG. 10, and surrounds the support housing 88. The AGV cart 94 is supported by rear wheels 96 and front wheels 98. The front wheels are driven by a drive system 100. The AGV cart may be an integral component of the module base 70 or may be detachable, as necessary or desired.

The illustrated embodiment uses jackscrews 118 for raising and lowering the module base 70. Alternatively, the AGV cart could utilize a design that incorporates hydraulic lifting using a hydraulic pump, reservoir, valves, flow divider, and plural cylinders.

Figure 3:
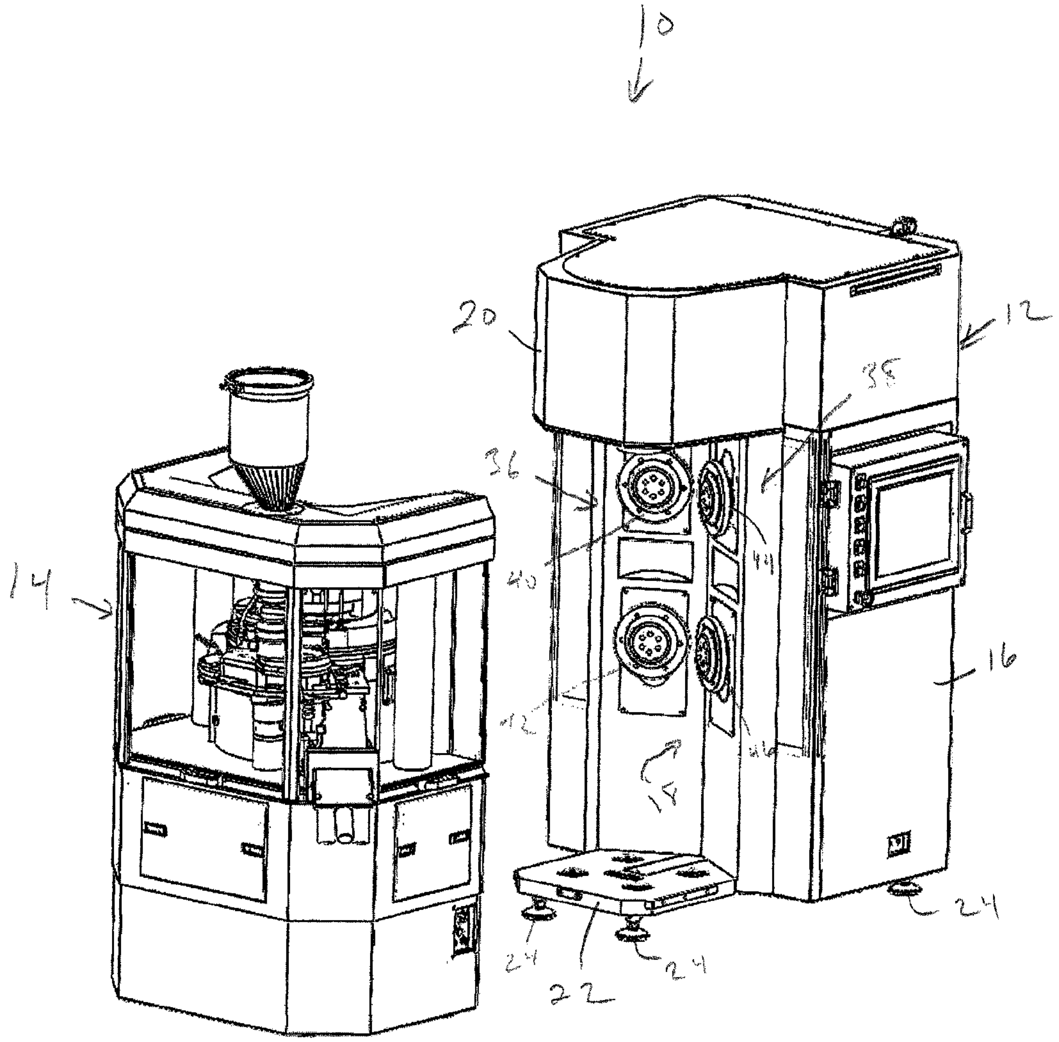
FIG. 3 is a perspective view of the press machine of FIG. 1 with the turret module detached from the machine frame.
Figure 13:
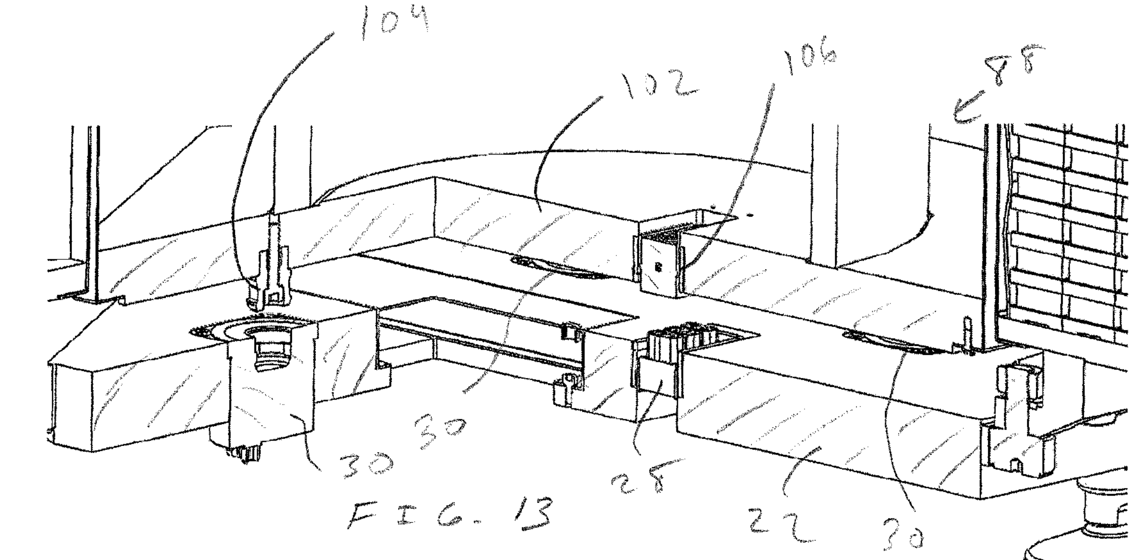
FIG. 13 is a cutaway rear perspective view, with parts removed for clarity, illustrating the turret module in a raised position and showing electrical and mechanical connection components disengaged.
Figure 14:
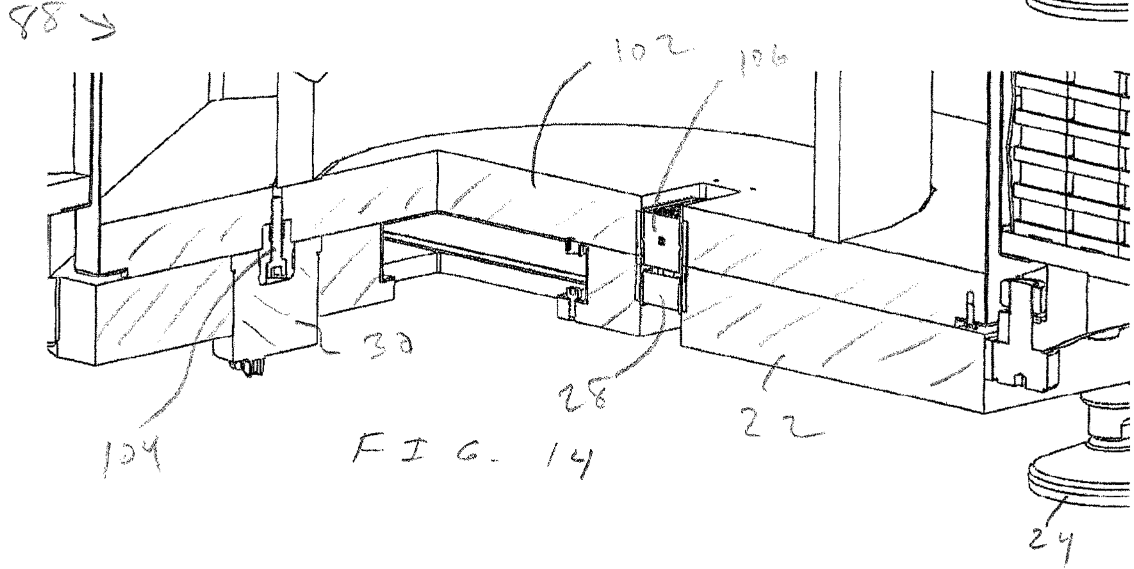
FIG. 14 is a cutaway rear perspective view, similar to FIG. 13, illustrating the turret module in a raised position showing electrical and mechanical connection components engaged.

The support housing 88 has a bottom wall 102, see FIGS. 13 and 14. The bottom wall 102 includes four downwardly depending zero point clamp nipples, one of which is shown at 104. The nipples 104 are positioned to be in alignment with the four zero point clamp receivers 30. The bottom wall also includes a centrally located male quick connector 106 mateable with the connection base female connector 28. FIG. 13 illustrates the support housing 88 in the raised position with the nipples 104 and the male connector 106 spaced from the receivers 30 and the female connector 28. FIG. 14 illustrates the support housing 88 in the lowered position with the nipples 104 and the male connector 106 mated with the receivers 30 and the female connector 28, respectively. This raising and lowering of the support housing is done with the AGV cart, as described below. With the module 14 positioned with the machine frame 12, as shown in FIGS. 1-3, the rollers 40, 42, 44 and 46 shown in FIG. 3, are positioned relative to the module 14 to engage the turret assembly 80 and contact punches, not shown, to compress the granulated powder to form a tablet, in a conventional manner.

Figure 10:
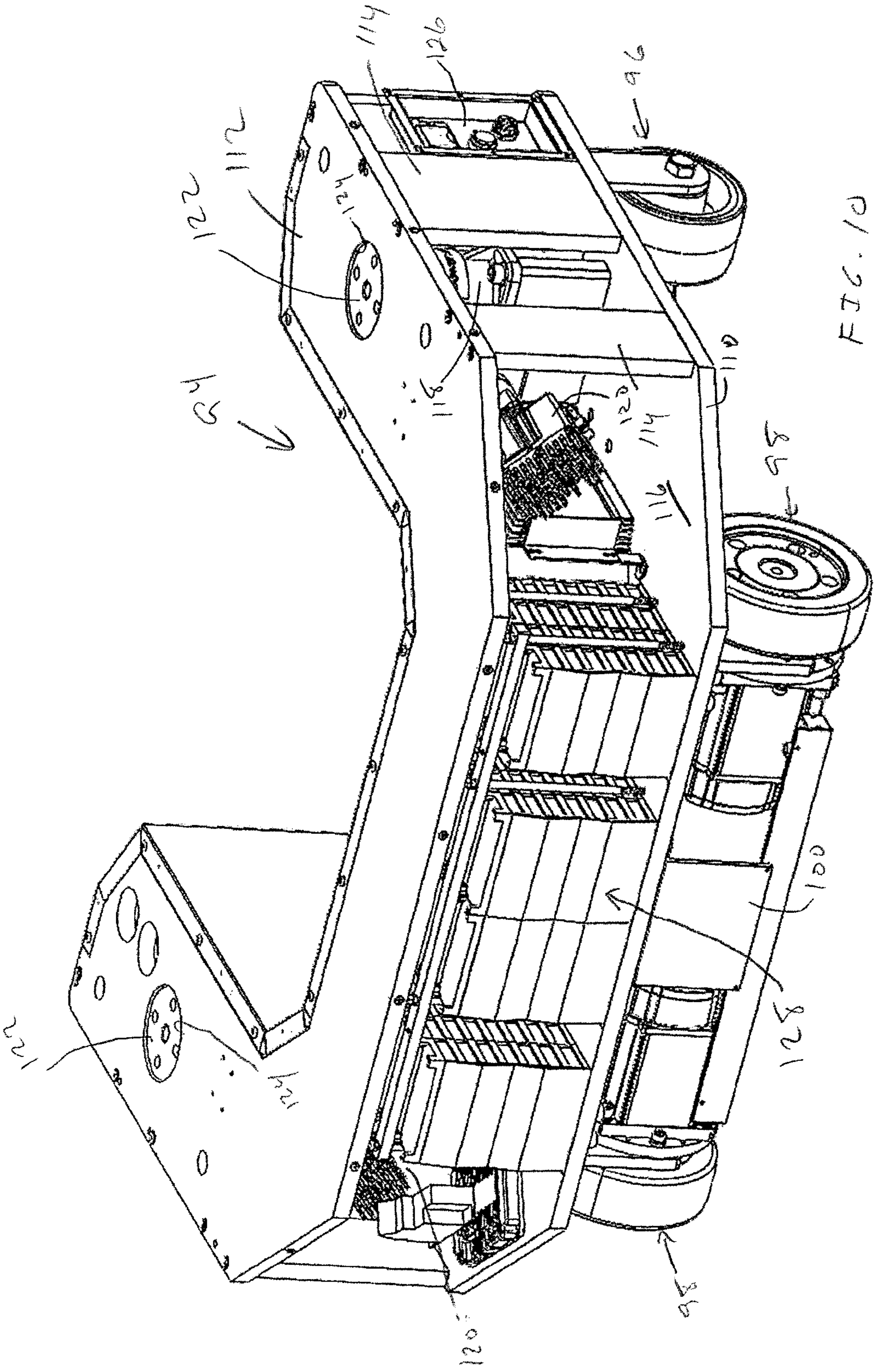
FIG. 10 is a perspective view of the AGV cart with a cover removed.

The AGV cart 94, shown in FIG. 10 with an outer wall removed for clarity, includes a bottom wall 110 and a top wall 112 connected by supports 114 to define an interior space 116. The bottom wall 110 supports opposite jackscrews, one of which is shown at 118, in the interior space 116, each driven by a motor 120. Each jackscrew 118 drives a jack plate 122 that passes through an opening 124 in the top wall 112. The jack plates 122 engage the weldment plate 90. Thus, the jackscrews 118 are controlled to raise and lower the weldment plate 90, and in turn raise and lower the module base 14. The motors are controlled by a cart control 126. The cart control 126 is powered by batteries 128 in the interior space 116. A control pad 130, see FIG. 23, may include a joy stick, or push buttons, or the like, for commanding operation of the AGV cart as by driving the wheel drive 100.

Figure 19:
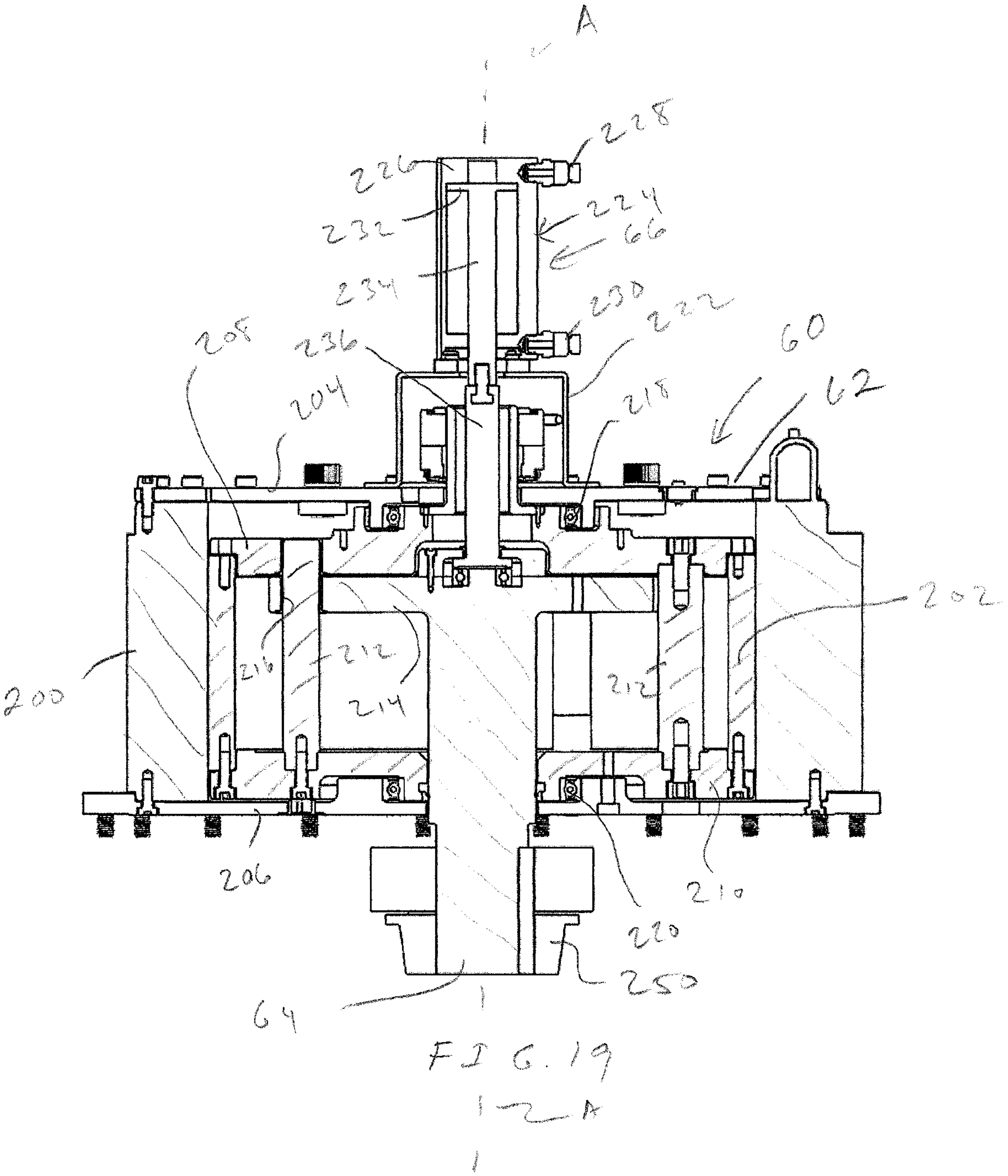
FIG. 19 is a sectional view of the motor drive assembly in accordance with the invention with a drive shaft in a raised or retracted position.

FIG. 19 illustrates the exemplary motor drive system 60 in accordance with an exemplary embodiment of the invention. The drive motor 62 comprises a brushless ring torque motor such as the Etel S.A. Model TMB+, which is a frameless, three-phase motor with open type servo motor stators.

The drive motor 62 comprises a cylindrical stator frame 200. A rotor ring 202 is rotational within the stator 200. A circular fixed top plate 204 is secured at the top of the stator 200. A circular fixed bottom plate 206 is secured at the bottom of the stator 200. A circular rotating top plate 208 is secured at the top of the rotor 202. A circular rotating bottom plate 210 is secured at the bottom of the rotor 202. A plurality of connecting posts 212, two of which are shown, are connected between the rotating plates 208 and 210. A drive plate 214, at the top of the drive shaft 64, has openings 216 journalled on the connecting posts 212. An upper bearing 218 is disposed between the fixed top plate 204 and the rotating top plate 208. A lower bearing 220 is disposed between the fixed bottom plate 206 and the rotating bottom plate 210. As such, rotation of the rotor 202 rotates the rotating plates 208 and 210 which in turn rotates the drive plate 214 and the drive shaft 64 about a vertical axis A.

In accordance with the invention, the motor drive assembly 60 uses a retractable drive shaft 64. An encoder housing 222 is mounted to the fixed top plate 204. The drive shaft control 66 comprises a pneumatic cylinder 224 including a housing 226 with a top port 228 and bottom port 230. The cylinder 224 uses the power of compressed gas to produce a force in a reciprocating linear motion. The ports 228 and 230 are for connection to a controlled source of pressurized gas. The cylinder housing 226 encloses a piston disc 232 linked to the top of a piston rod 234 which extend out the bottom of the housing 226. The piston rod 234 is connected to a cylinder shaft 236. The cylinder shaft 236 extends into the drive motor 62 and is operatively connected to the drive plate 214.

Figure 20:
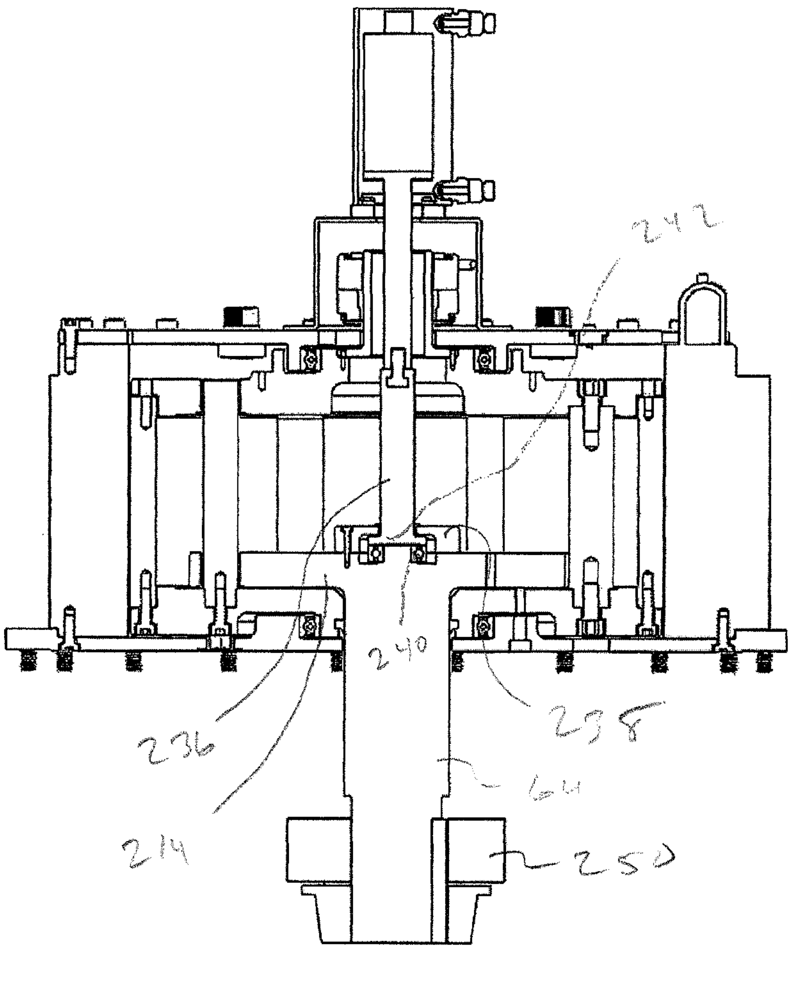
FIG. 20 is a sectional view similar to FIG. 19 with the drive shaft in a lowered or extended position.

Particularly, a drive shaft cap 238, see FIG. 20, is operatively secured to the drive plate 214 to rotate with the drive shaft 64. The drive shaft cap 238 houses a bearing 240 and the cylinder shaft 236 has a head 242 extending into the drive shaft cap 238. The bearing 240 enables the cylinder shaft 236 to remain idle and in contact with the drive plate 214 while the drive shaft 64 is rotating. The drive shaft cap 238 only contacts the cylinder shaft head 242 when the pneumatic cylinder 224 engages to lift the drive shaft 64. FIG. 20 illustrates the drive shaft 64 in the lowered or extended position while FIG. 19 illustrates the drive shaft 64 in the raised or retracted position.

Figure 22:
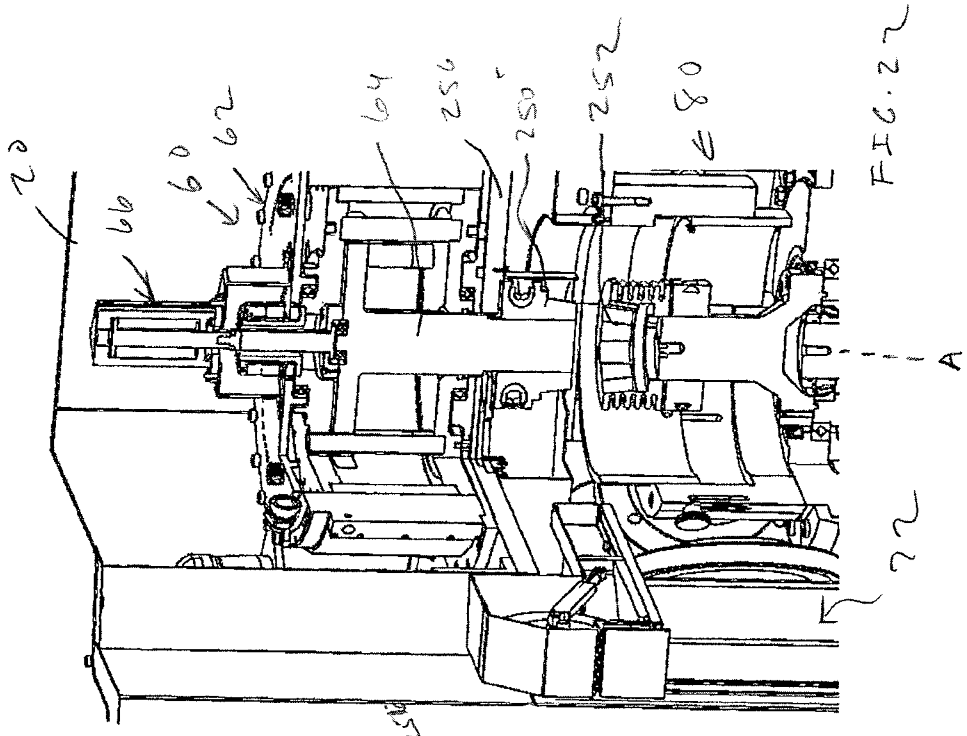
FIG. 22 is a view similar to FIG. 21 with the drive shaft the raised or retracted position disengaged from the turret assembly.
Figure 21:
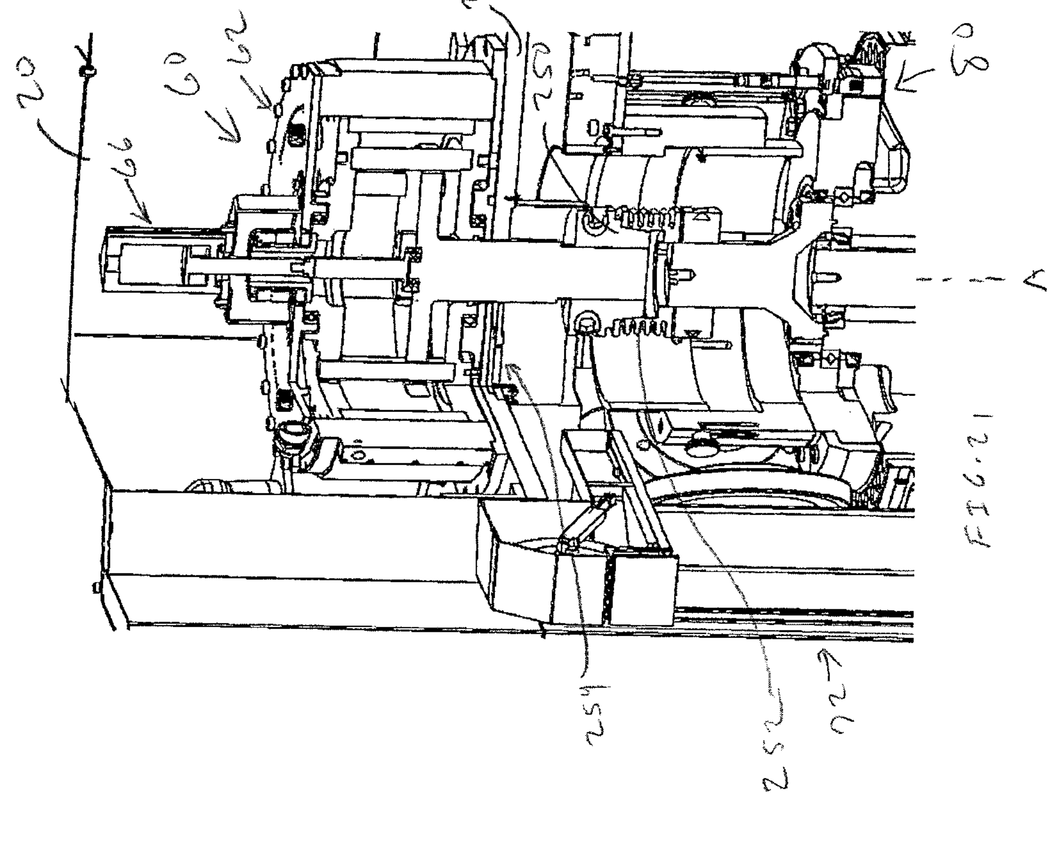
FIG. 21 is a cutaway sectional view illustrating the motor drive system with the drive shaft the lowered or extended position engaging the turret assembly.

A collar 250 is mounted to the bottom end of the drive shaft 64 for engaging a hub 252 of the turret assembly 80, see FIGS. 21 and 22. FIG. 21 shows the illustrates the drive shaft 64 in the lowered or extended position with the collar 250 received in and engaging the hub 252 for rotation therewith. FIG. 22 illustrates the drive shaft 64 in the raised or retracted position with the collar 250 spaced from the hub 252. This permits for removal of the turret assembly 80 with the detachable module 14.

Figure 23:
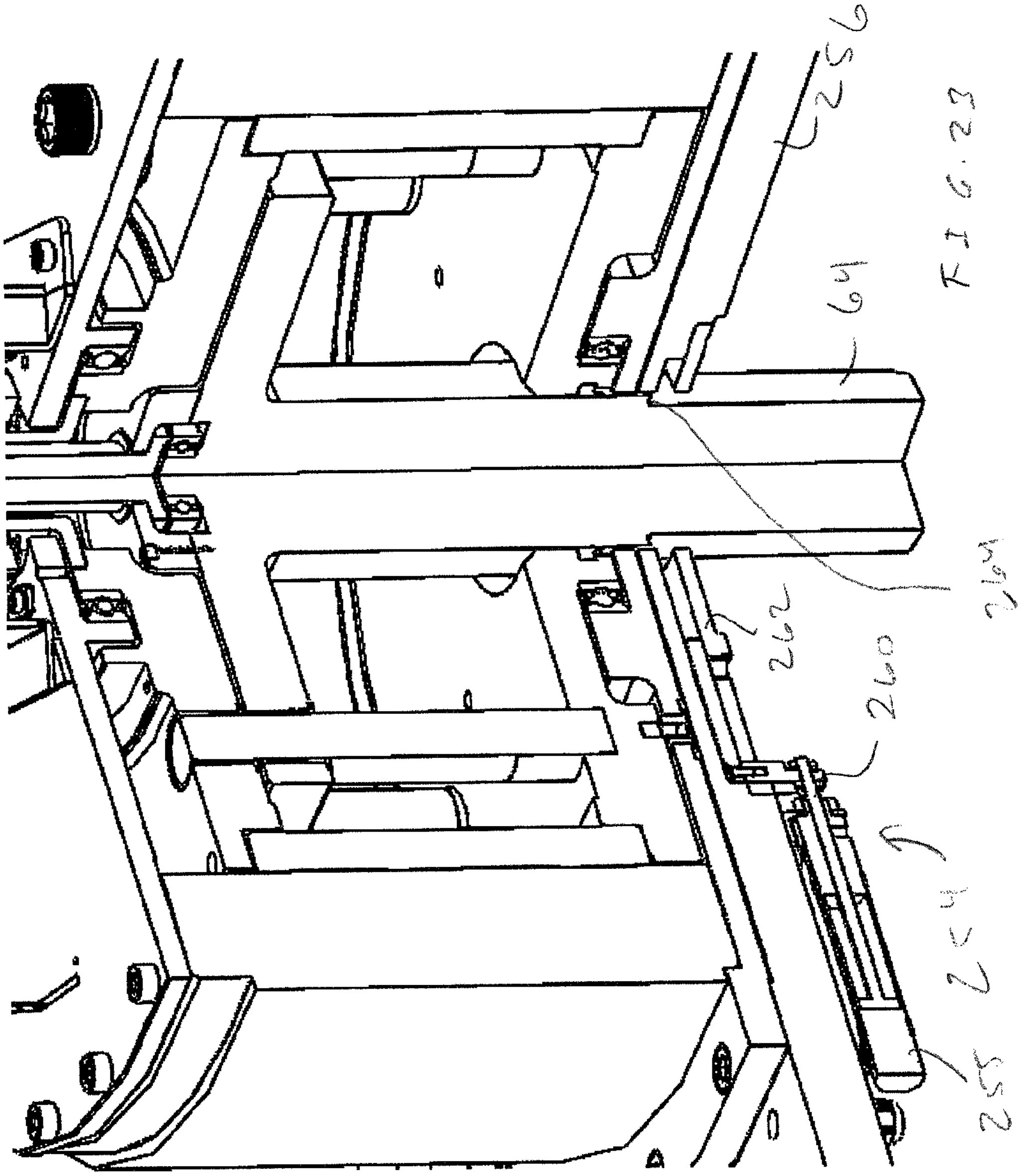
FIG. 23 is an enlarged view of a portion of FIG. 19 with a shaft safety locking mechanism disengaged.
Figure 24:
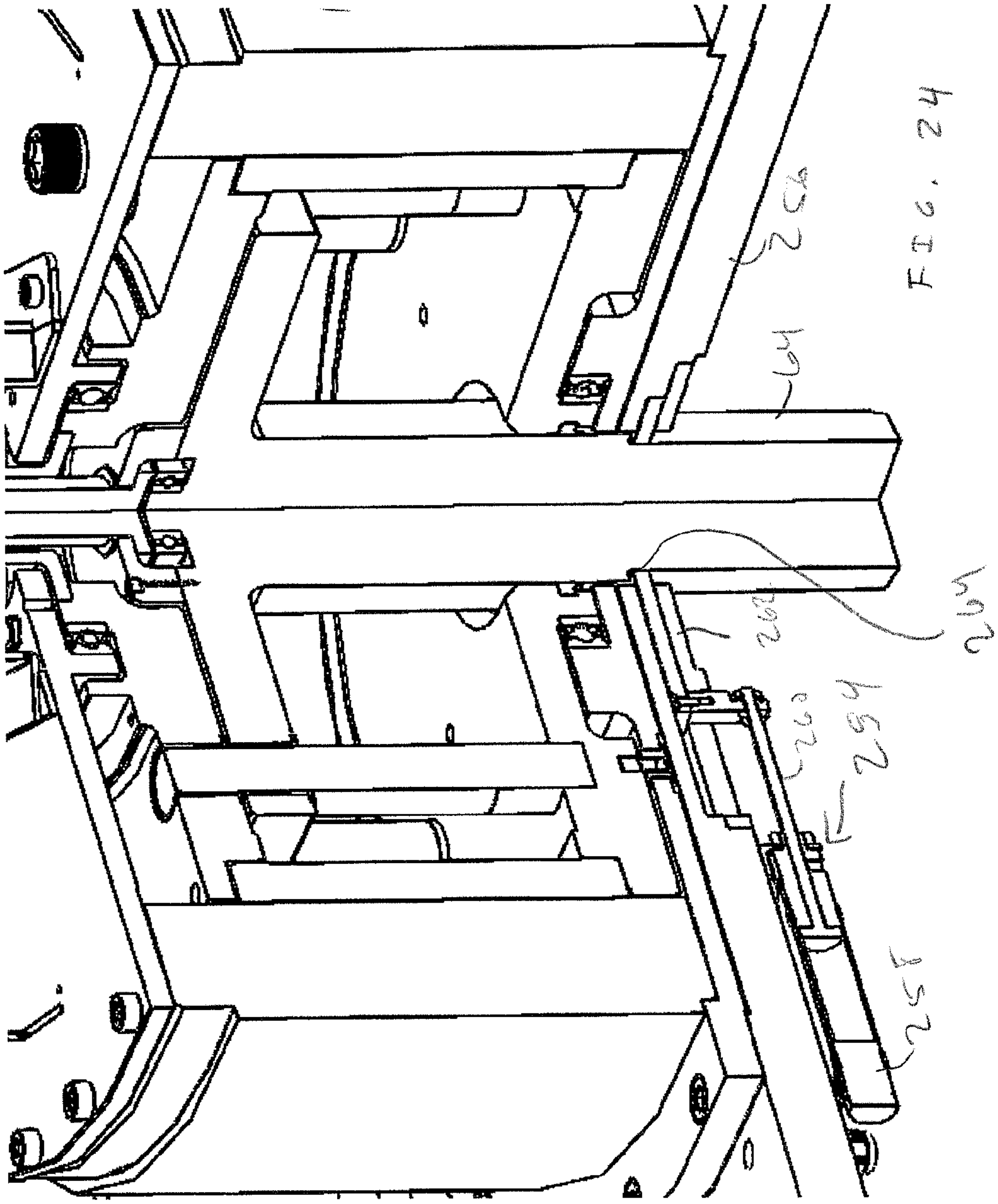
FIG. 24 is an enlarged view similar to FIG. 23 with the shaft safety locking mechanism engaged.

In order to prevent the drive shaft 64 from inadvertently being lowered when not is use, a safety lock system 254 is mounted to a bottom wall 256 of the drive housing 20. The safety lock system 254 is shown in FIGS. 23 and 24. The safety lock system 254 comprises a pneumatic cylinder 258 having a piston rod 260 operating an actuator arm 262. The drive shaft 64 includes a detent or stop 264. When the drive shaft 64 is in the raised position, see FIG. 23, then the pneumatic cylinder 258 can be operated to extend the arm 262 to engage the stop 264, see FIG. 24.

Figure 25:
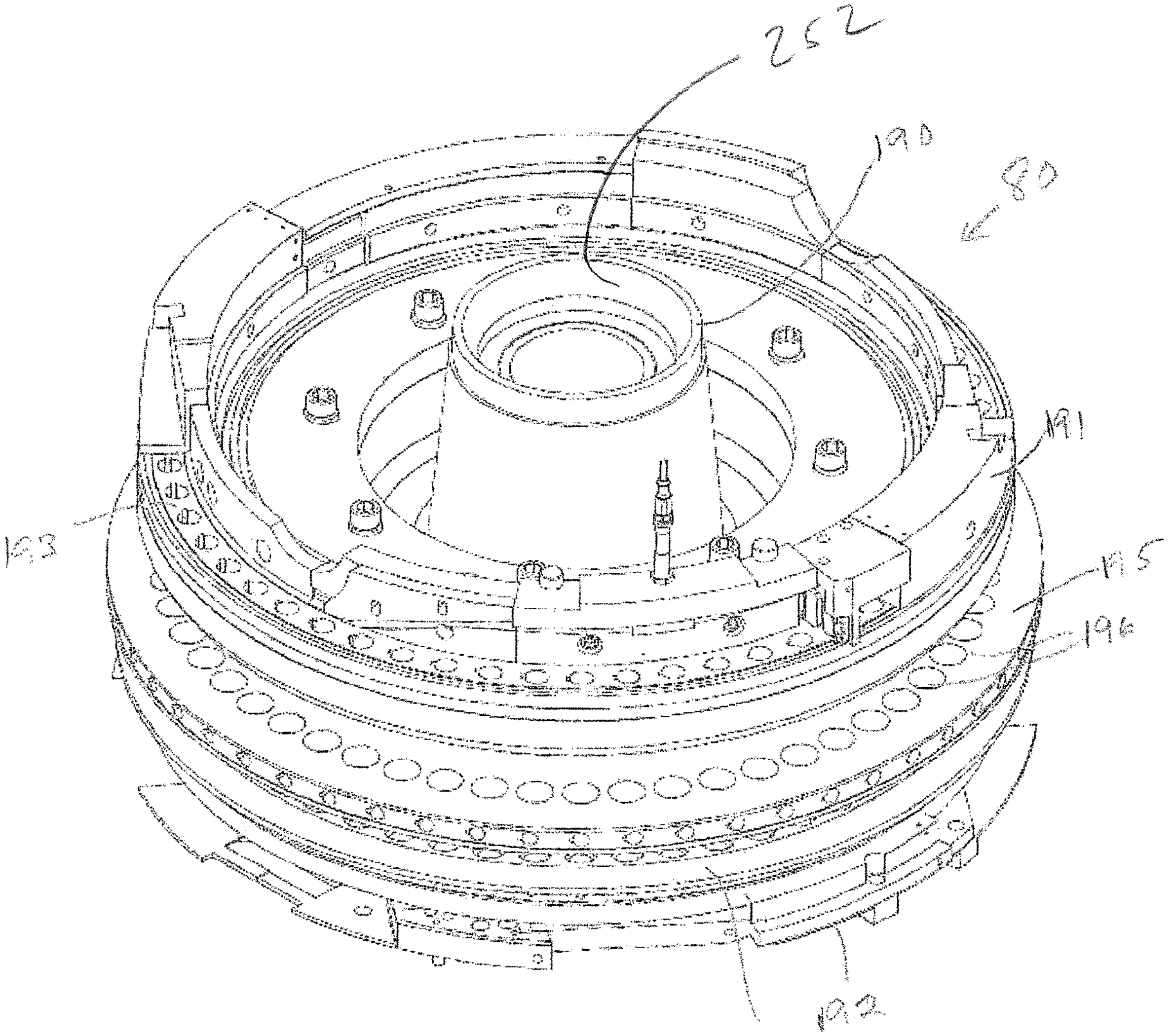
FIG. 25 is a perspective view of an exemplary turret assembly.

FIG. 25 illustrates an exemplary turret assembly 80. The turret assembly 80 includes an upper cam body 190, including the hub 252, which is driven by the drive shaft 64. An upper cam track assembly 191, lower cam track assembly 192, an upper turret section 193 (for upper punches), a lower turret section 194 (for lower punches) and a die table 195 are operatively secured to the upper cam body 190. Only the turret sections and installed punches and dies rotate. The cams (individual parts) or cam tracks (combination of cams in upper and lower segments) do not rotate, as is known. As the turret rotates, the punches follow the path in the cams for raising and lowering the punches. The upper punches (not shown) are operated by the upper cam track assembly 191 in a conventional manner. The lower punches (not shown) are operated by the lower cam track assembly 192 in a conventional manner. The die table 195 includes plural openings 196 each for receiving a die (not shown). As the turret assembly 80 rotates, the punches follow the respective cam tracks 191 and 192 and reciprocate relative to the dies. Each die receives granulation as they are rotated under the feeder assembly 86. A tablet is formed when the punches contact the upper rollers 40 and 44 and the lower rollers 42 and 46, as is known, causing compaction of the granulation in the die. The upper punches are then raised by the upper cam track 191 and ejected by the lower cam track 192 causing the lower punches to be raised. This general operation is conventional, and the exact configuration will depend, in part, on the tablet being manufactured.

Figure 26:
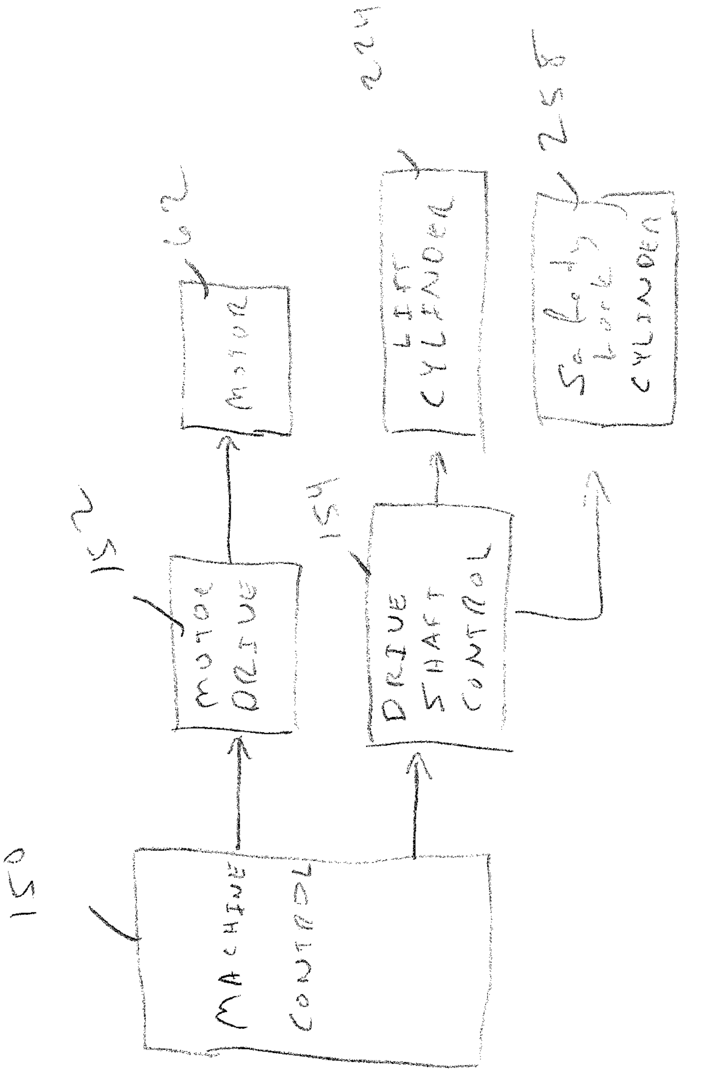
FIG. 26 is a block diagram of a control system for the rotary tablet press of FIG. 1.

FIG. 26 is a block diagram for relevant portions of a control system for the turret press 10. The machine frame 12 houses a machine control 150. The machine control 150 comprises a programmed processing system using a processor and memory, as is conventional, for controlling overall operation of the tablet press 10, as necessary or desired. The machine control 150 is operatively associated with a motor drive control 152 for controlling the drive motor 62. The machine control also controls a drive shaft control 154 which operatively controls the lift cylinder 224 and the safety lock cylinder 258.

In operation, the machine control 150 allows for change-over such as during removing and replacing the detachable module 14, discussed above. When the detachable module 14 has been locked in place with the machine frame 12, see FIG. 1, the drive shaft control 154 retracts the safety lock cylinder 258 to release the safety lock mechanism 254, from FIG. 24 to FIG. 23. The lift cylinder 224 is then controlled to lower the drive shaft 64 to engage the turret assembly 80. Once machine operation commences then the torque motor 62 is controlled to rotate the drive shaft 64 and thus the turret assembly 80. Opposite steps are used to remove the detachable module 14, as will be apparent.

In accordance with the invention, a manufacturer may have a plurality of different turret modules for use with a single machine frame 12. Each module can have a different turret assembly and appurtenances depending on the type of tablet to be produced. There will be at least four total configurations for this machine design utilizing a machine frame with compression and drive assemblies with a removable module including a turret, feeder, and cam module assembly. Each will offer different turret configurations. Also, different configurations of the machine frame 12 may be provided with different number and configuration of compression roller assemblies, as discussed below.

For example, the rotary tablet press in accordance with the invention may be configured to be Single Layer & Single Sided (one feeder, one product); Single Layer & Double Sided (two feeders, two products); Bilayer (two feeders, one product); and Trilayer (three feeders, one product). A single sided press has only one feeder, and it is designed to make a single layer tablet. It is designed with two equal size compression assemblies for pre-compression and main compression. A triple sided press has three feeders, and it is designed to make a triple layer containing three different granulations. It is designed with one large compression assembly for main compression.

Figure 4:
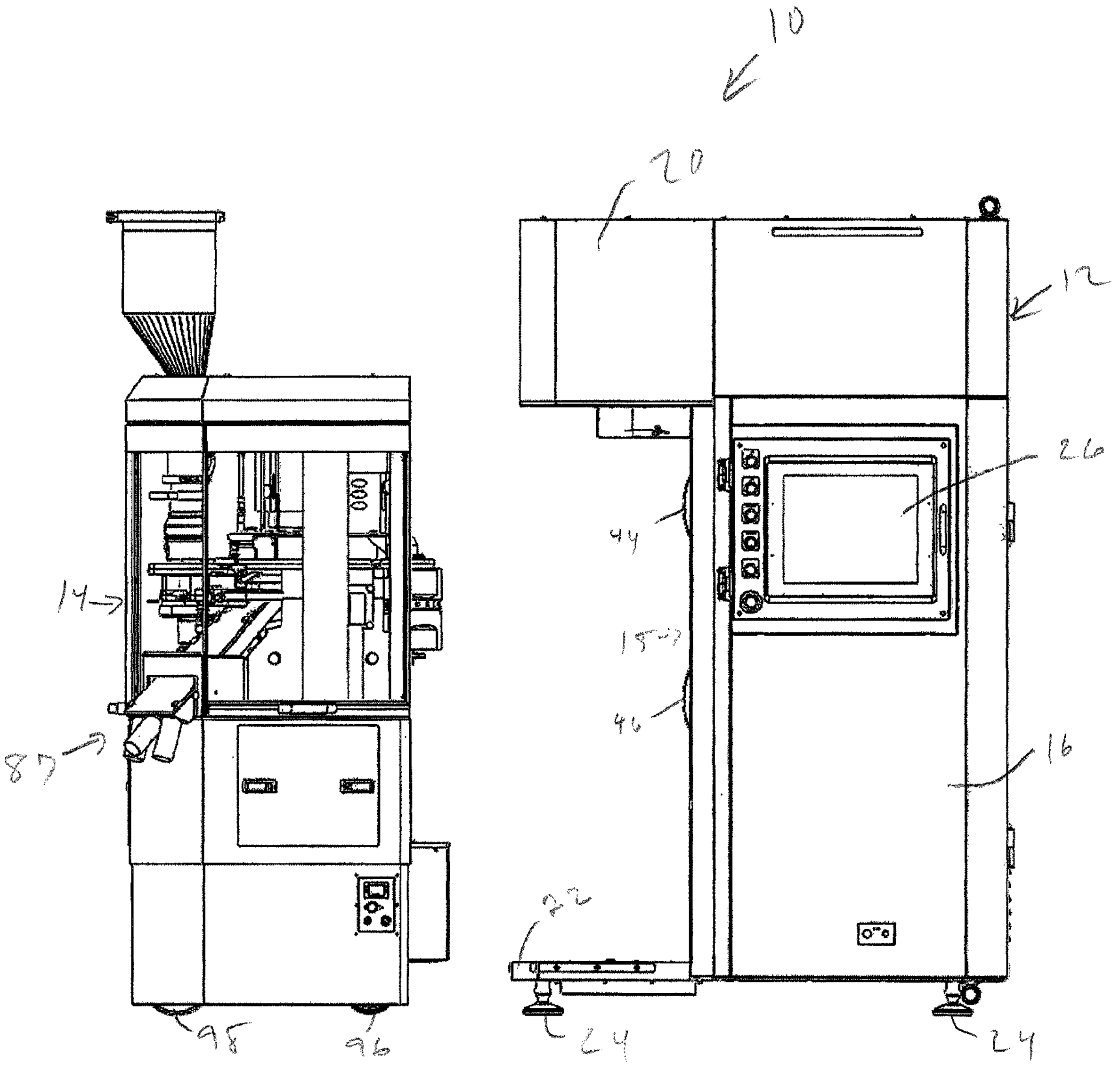
FIG. 4 is a right side view of the press machine of FIG. 3.
Figure 5:
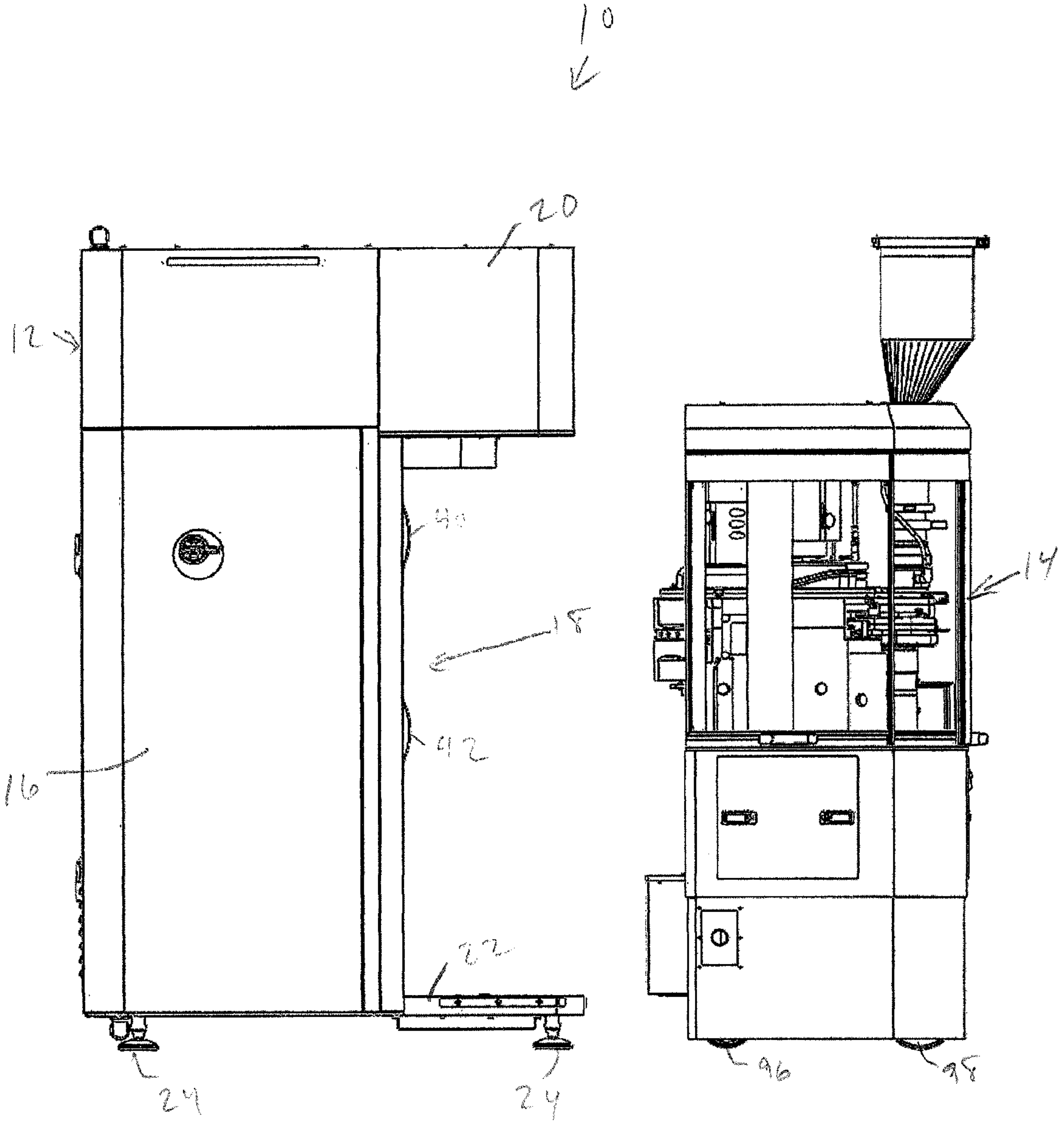
FIG. 5 is a left side view of the press machine of FIG. 3.
Figure 12:
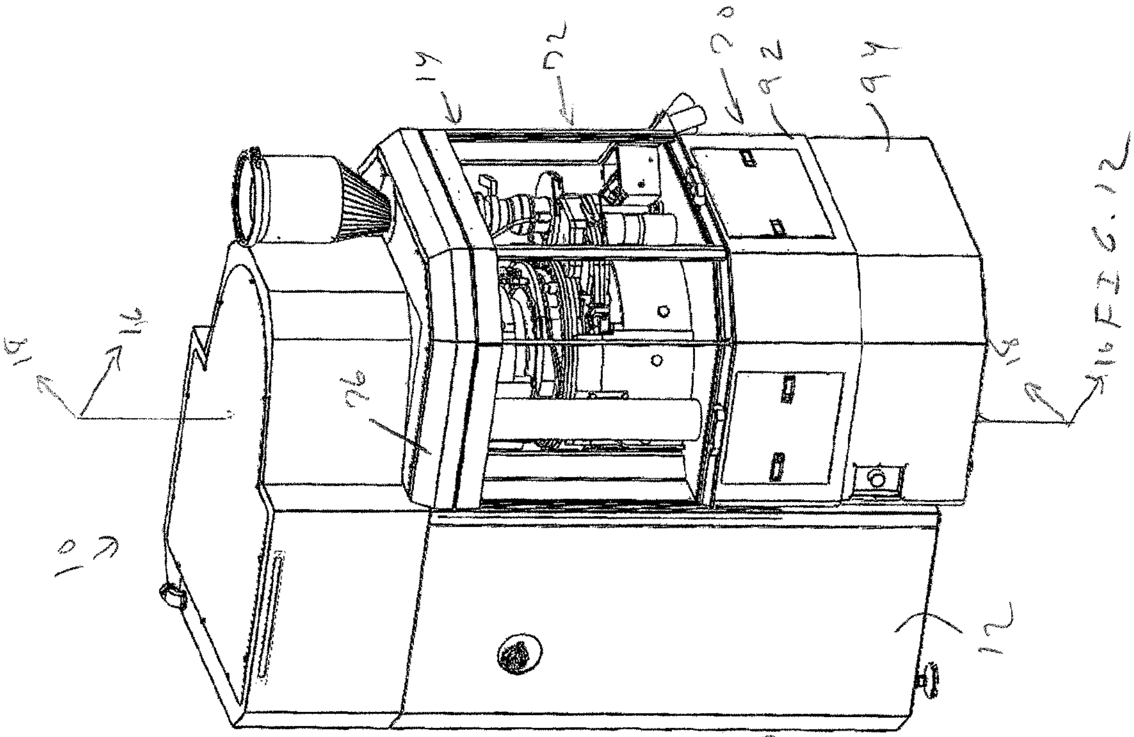
FIG. 12 is a perspective view of the press machine of FIG. 1 with the turret module in a lowered position.
Figure 11:
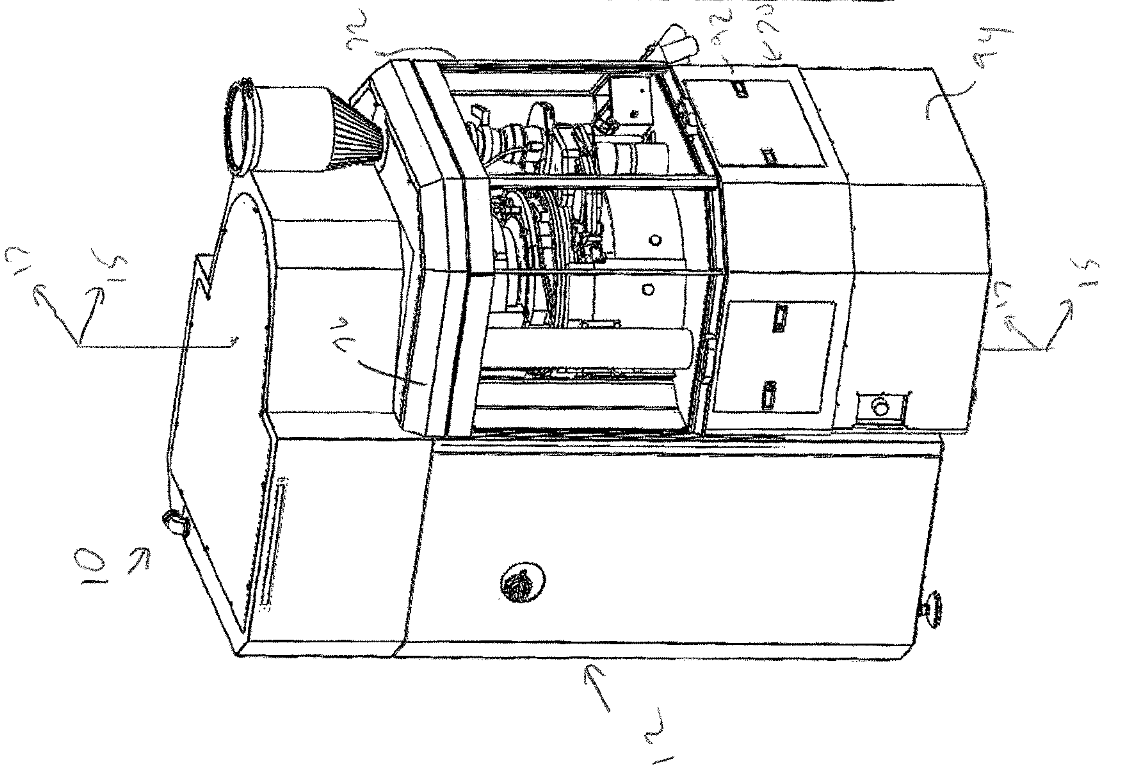
FIG. 11 is a perspective view of the press machine of FIG. 1 with the turret module in a raised position.
Figure 15:
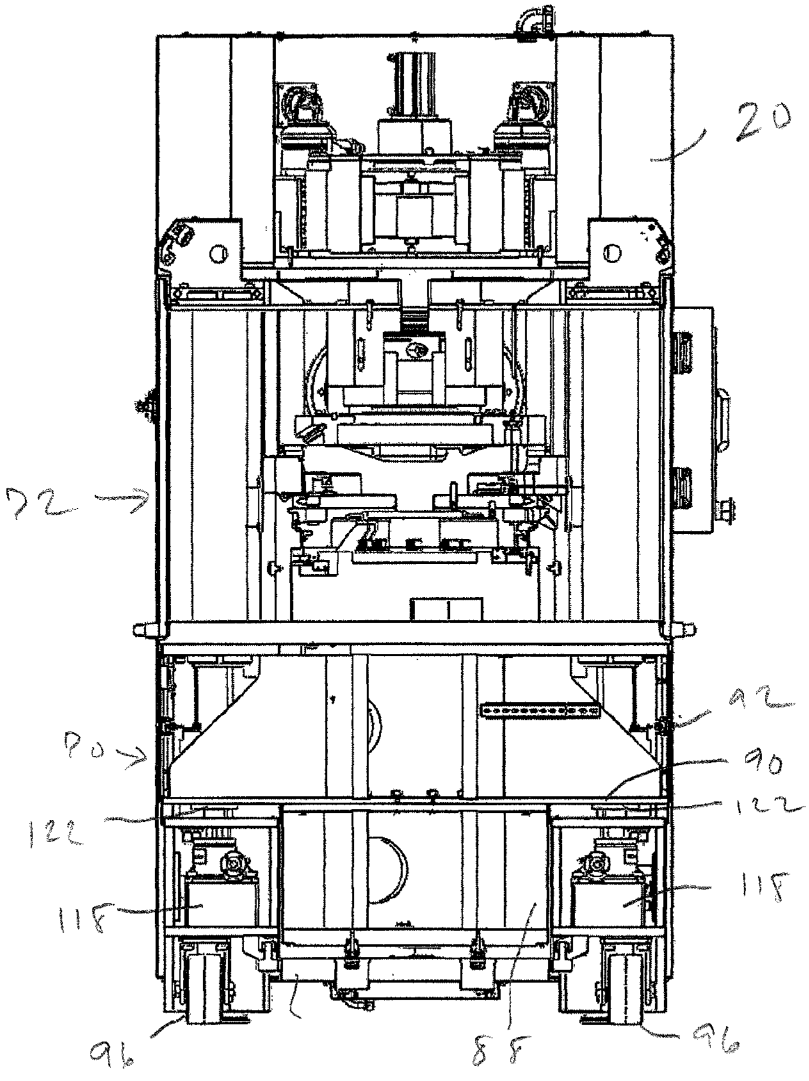
FIG. 15 is a sectional view taken along the line 15-15 of FIG. 11 with the turret module in the raised position.
Figure 16:
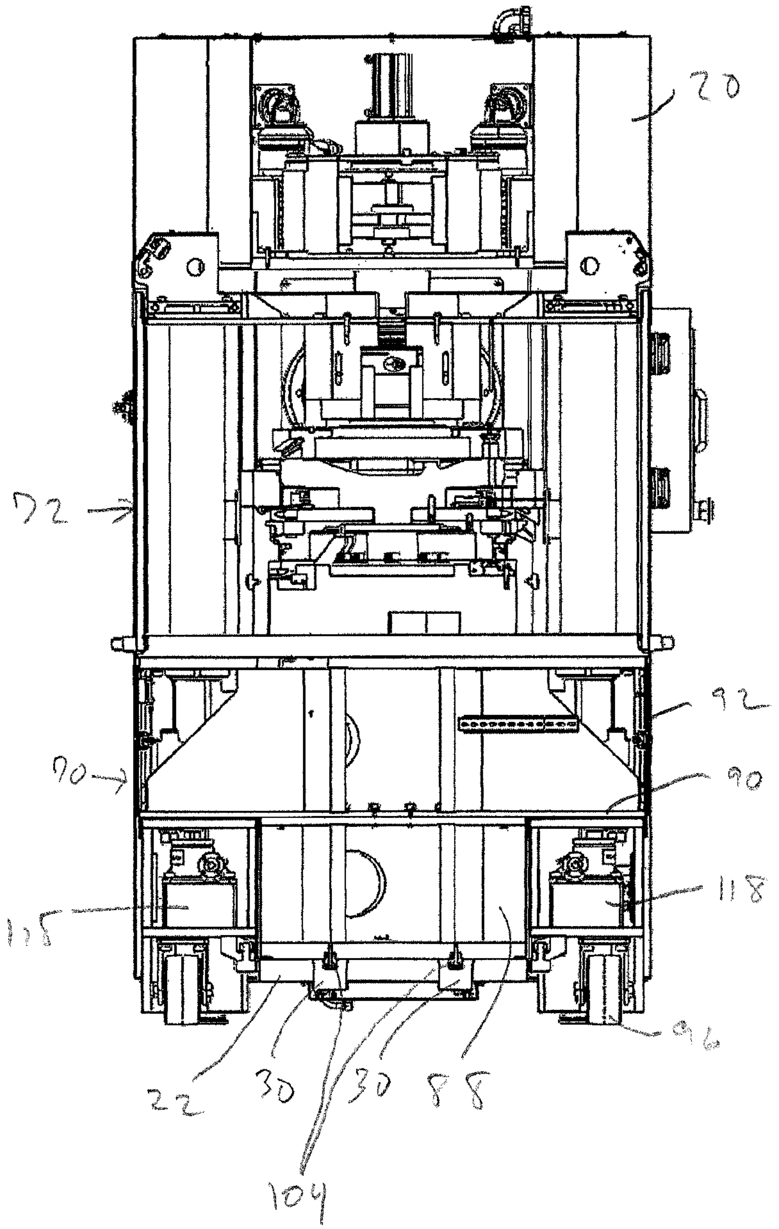
FIG. 16 is a sectional view taken along the line 16-16 of FIG. 12 with the turret module in the lowered position.
Figure 18:
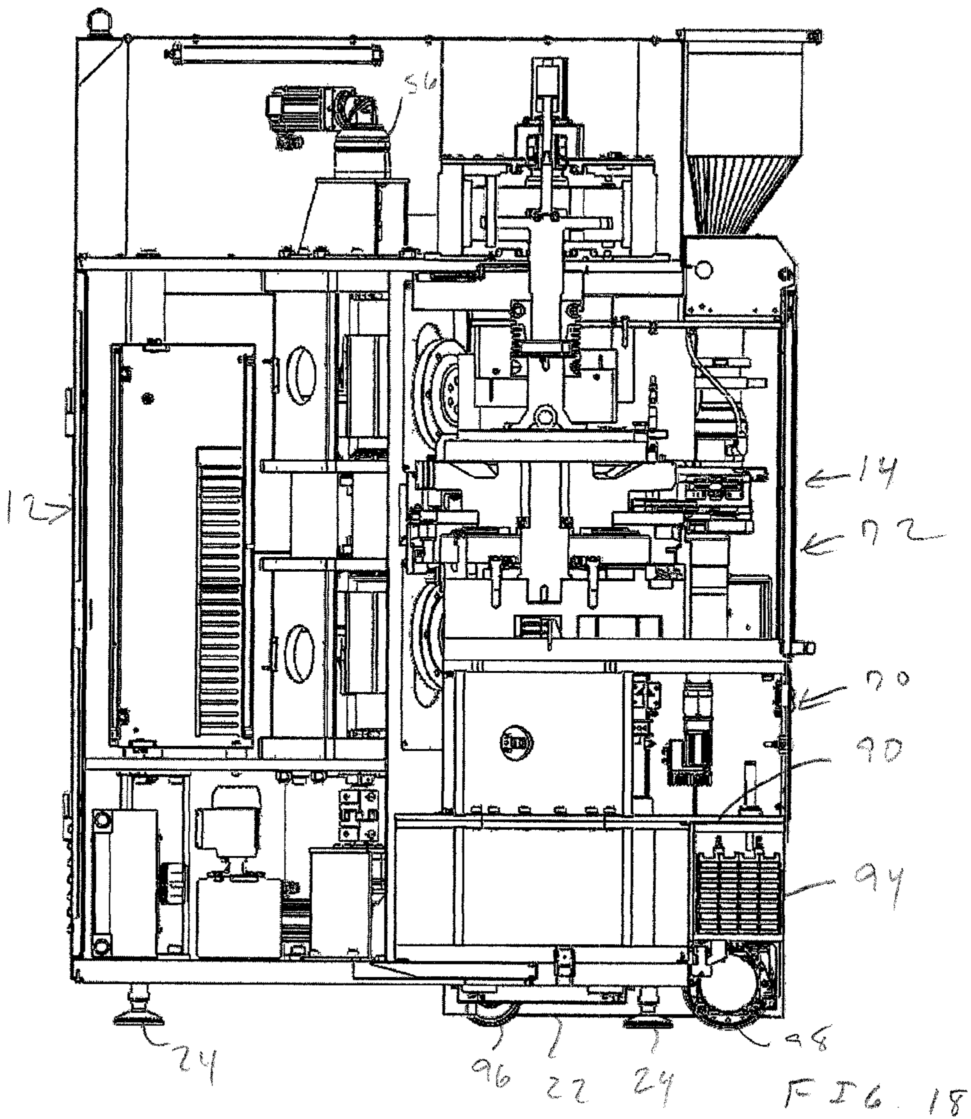
FIG. 18 is a sectional view taken along the line 18-18 of FIG. 12 with the turret module in the lowered position.

FIGS. 1 and 2 illustrate the detachable module 14 engaged with the machine frame 12 in an operating position. FIGS. 3-5 illustrate the detachable module 14 removed from the machine frame 12 for a cleaning or maintenance operation, or the like. To remove the module 14 from the machine frame 12, the drive shaft 64 must be raised, as described, and the zero point clamp receivers 30 must be deenergized. The module 14 is then raised by the AGV cart 94. The AGV cart is then driven to separate the module 14 from the machine frame. The module can then be lowered for stability. Similarly, to couple the module 14 to the machine frame 12, the AGV cart 94 must first raise the module 14, and then drive the module 14 so that the support housing 88 is above the connection base 22, and then lower the module 14. FIGS. 11, 15 and 17 illustrate the module 14 in the raised position relative to the connection base 22, and thus the machine frame 12. FIGS. 12, 16 and 18 illustrate the module 14 in the lowered position relative to the connection base 22, and thus the machine frame 12. This is most apparent by comparing the position of the turret housing top wall 76 in FIG. 11 to that in FIG. 12, and comparing position of the weldment plate 90 in FIGS. 15 and 17 to that in FIGS. 16 and 18.

As described in the illustrated embodiments, a rotary tablet press comprises a machine frame and detachable module. Granulation is fed into the module from a hopper and travels into the feeder chamber. The machine frame comprises motorized pressure roll assemblies and a turret drive assembly. The detachable module comprises a module base, turret base, turret, cam body, cams, feeder, tablet discharge chute, hopper, upper enclosure, and guard doors. The rotary turret comprises upper punches, dies, and lower punches. As the turret rotates, the dies move underneath the feeder chamber. The rotary feeder paddles move the granulation and assist with feeding powder to the dies. Punches travel along cam tracks as the turret rotates and compresses the powder into a tablet when the punches contact the pressure rolls. An ejection cam pushes the lower punch in the upward direction and a take-off bar mounted just above the die table directs the tablet into a discharge chute. The detachable module is sealed by incorporating an upper enclosure.

More particularly, the rotary tablet press comprises a press housing having bottom and top ends, the bottom for resting on a support surface. A compression assembly in the press housing includes pressure roll assemblies. A drive housing extends outwardly from the top end of the press housing. A motor drive assembly is in the drive housing and comprises a turret motor rotationally driving a drive shaft extending downward from the turret motor, the drive shaft being mounted for axial movement along a vertical axis in the turret motor. A drive shaft control is operable to controllably raise and lower the drive shaft. A turret assembly comprises a plurality of die stations, the turret assembly being mounted to the press housing below the drive housing and about the vertical axis so that the pressure roll assemblies engage the turret assembly to compress a granulation into a tablet at the die stations, the drive shaft engaging the turret assembly to rotate the turret assembly responsive to the drive shaft control lowering the drive shaft.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A rotary tablet press comprising:

a press housing having bottom and top ends, the bottom for resting on a support surface;

a compression assembly in the press housing and including pressure roll assemblies;

a drive housing extending outwardly from the top end of the press housing;

a motor drive assembly in the drive housing and comprising a turret motor rotationally driving a drive shaft extending downward from the turret motor, the drive shaft being mounted for axial movement along a vertical axis in the turret motor;

a drive shaft control operable to controllably raise and lower the drive shaft; and a turret assembly comprising a plurality of die stations, the turret assembly being mounted to the press housing below the drive housing and about the vertical axis so that the pressure roll assemblies engage the turret assembly to compress a granulation into a tablet at the die stations, the drive shaft engaging the turret assembly to rotate the turret assembly responsive to the drive shaft control lowering the drive shaft.

2. The rotary tablet press of claim 1 wherein the drive shaft control comprises a pneumatic cylinder operating a cylinder shaft coupled to the drive shaft.

3. The rotary tablet press of claim 2 wherein the drive shaft control comprises a drive shaft cap operatively secured to the drive shaft to rotate with the drive shaft, the drive shaft cap housing a bearing, and the cylinder shaft has a head extending into the drive shaft cap, wherein the bearing enables the cylinder shaft to remain idle and in contact with the drive shaft while it is rotating and wherein the cap does not contact the cylinder shaft head until the pneumatic cylinder engages to lift the drive shaft.

4. The rotary tablet press of claim 1 wherein the turret motor comprises a torque motor.

5. The rotary tablet press of claim 4 wherein the torque motor comprises a brushless ring torque motor.

6. The rotary tablet press of claim 4 wherein the torque motor comprises a ring stator having circular upper and lower rotating plates attached to the rotor and a plurality of connecting posts extending between the upper and lower rotating plates.

7. The rotary tablet press of claim 6 wherein the torque motor comprises a drive plate journalled on the connecting posts for rotation therewith and secured to a top end of the drive shaft.

8. The rotary tablet press of claim 7 wherein the drive plate is operatively connected to the drive shaft control to raise and lower the drive shaft.

9. The rotary tablet press of claim 6 wherein the turret motor comprises a fixed top and bottom fixed plates operatively secured to a stator and further comprising upper and lower bearings between the top fixed plate and the upper rotating plate and the bottom fixed plate and the lower rotating plate, respectively.

10. The rotary tablet press of claim 1 further comprising a safety lock secured to the drive housing for selectively engaging the drive shaft to maintain the drive shaft in a raised locked position.

11. The rotary tablet press of claim 10 wherein the safety lock comprises a pneumatic cylinder operating an actuator arm for selectively engaging a detent in the drive shaft.

12. The rotary tablet press of claim 1 further comprising a collar at a lower end of the drive shaft for selectively engaging an upper cam body of the turret assembly.

13. The rotary tablet press of claim 1 wherein the turret assembly comprises a plurality of dies and associated top and bottom punches driven by top and bottom cams to compress a granulation into a tablet.

14. The rotary tablet press of claim 1 further comprising a detachable module removably mountable to the press housing and comprising a module base supporting a turret housing, the turret assembly being rotatably mounted in in the turret housing.

* * * * *